United States Patent
Williamson et al.

(10) Patent No.: US 7,437,758 B2
(45) Date of Patent: *Oct. 14, 2008

(54) PROPAGATION OF VIRUSES THROUGH AN INFORMATION TECHNOLOGY NETWORK

(75) Inventors: Matthew Murray Williamson, Bristol (GB); Andrew Patrick Norman, Bristol (GB); Jonathan Griffin, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 808 days.

This patent is subject to a terminal disclaimer.

(21) Appl. No.: 10/697,044

(22) Filed: Oct. 31, 2003

(65) Prior Publication Data

US 2004/0255159 A1 Dec. 16, 2004

(30) Foreign Application Priority Data

Apr. 29, 2003 (GB) ................... 0309856.3

(51) Int. Cl.
*G06F 15/18* (2006.01)
*G06F 15/16* (2006.01)
(52) U.S. Cl. ........................... 726/22; 709/232
(58) Field of Classification Search ............ 726/22
See application file for complete search history.

(56) References Cited

U.S. PATENT DOCUMENTS

| | | | |
|---|---|---|---|
| 5,699,513 A | 12/1997 | Feigen et al. | 395/187.01 |
| 6,044,402 A | 3/2000 | Jacobson et al. | 709/225 |
| 6,256,671 B1 | 7/2001 | Strentzsch et al. | 709/227 |
| 6,633,835 B1 * | 10/2003 | Moran et al. | 702/190 |
| 6,789,203 B1 * | 9/2004 | Belissent | 726/22 |
| 7,096,498 B2 * | 8/2006 | Judge | 726/22 |
| 7,099,320 B1 * | 8/2006 | Salerno | 370/389 |
| 7,137,144 B1 * | 11/2006 | Attwood et al. | 726/13 |
| 7,159,149 B2 * | 1/2007 | Spiegel et al. | 714/43 |
| 7,373,665 B2 * | 5/2008 | Williamson et al. | 726/22 |
| 2002/0035698 A1 * | 3/2002 | Malan et al. | 713/201 |
| 2002/0073338 A1 * | 6/2002 | Burrows et al. | 713/201 |
| 2003/0023875 A1 * | 1/2003 | Hursey et al. | 713/201 |
| 2004/0093513 A1 * | 5/2004 | Cantrell et al. | 713/201 |

FOREIGN PATENT DOCUMENTS

| | | |
|---|---|---|
| EP | 0 986 229 A2 | 3/2000 |
| EP | 1 280 298 | 1/2003 |
| GB | 2 001 227 A | 1/1979 |
| GB | 2 315 967 A | 2/1998 |
| GB | 2 362 076 A | 11/2001 |
| GB | 2 367 714 A | 4/2002 |
| GB | 2 368 163 A | 4/2002 |
| GB | 2 373 130 A | 9/2002 |
| WO | 98/33333 | 7/1998 |
| WO | 01/86895 | 11/2001 |
| WO | WO 02/045380 | 6/2002 |

* cited by examiner

*Primary Examiner*—Matthew Heneghan

(57) ABSTRACT

Propagation of viruses in a network having a plurality of hosts is restricted. Network activity of a first host of the plurality is monitored, and a first record established which is at least indicative of identities of hosts within the network contacted by a first host. Contact of the first host to other hosts within the network is limited over the course of a first time interval, so that during the first time interval the first host is unable to contact more than a predetermined number of hosts not in the first record. The method further includes an additional selection process for determining hosts of the plurality the first host is allowed to contact.

24 Claims, 14 Drawing Sheets

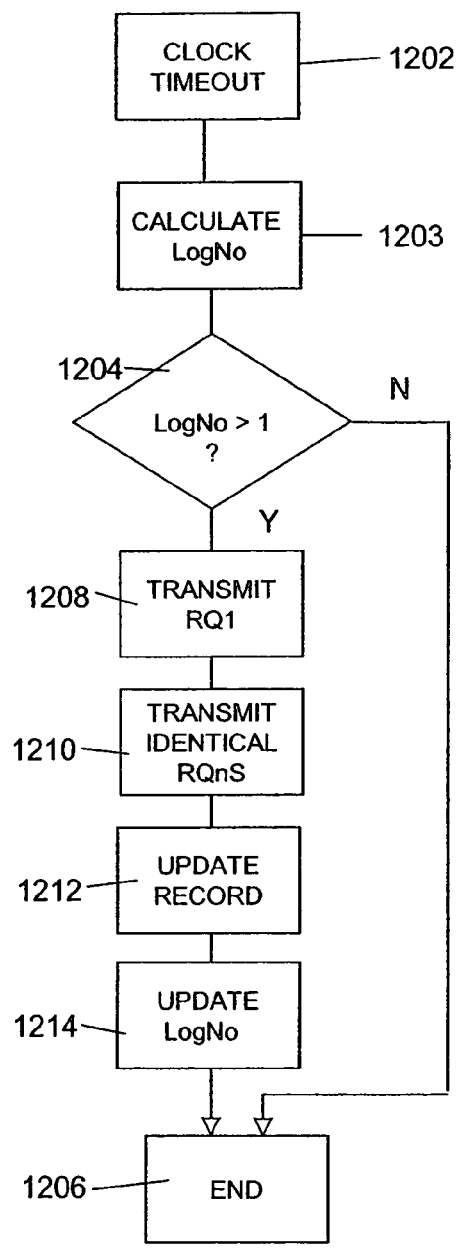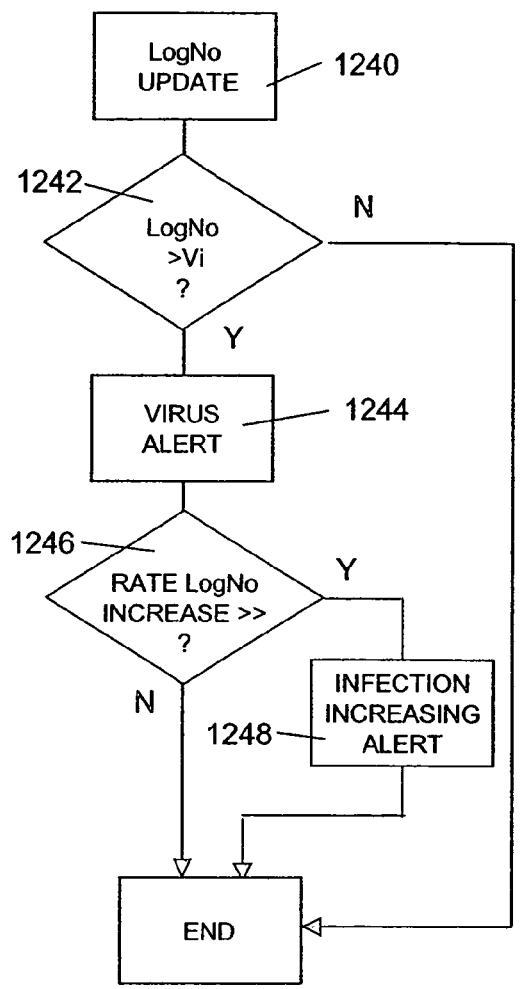
Fig. 12A
Fig. 12B

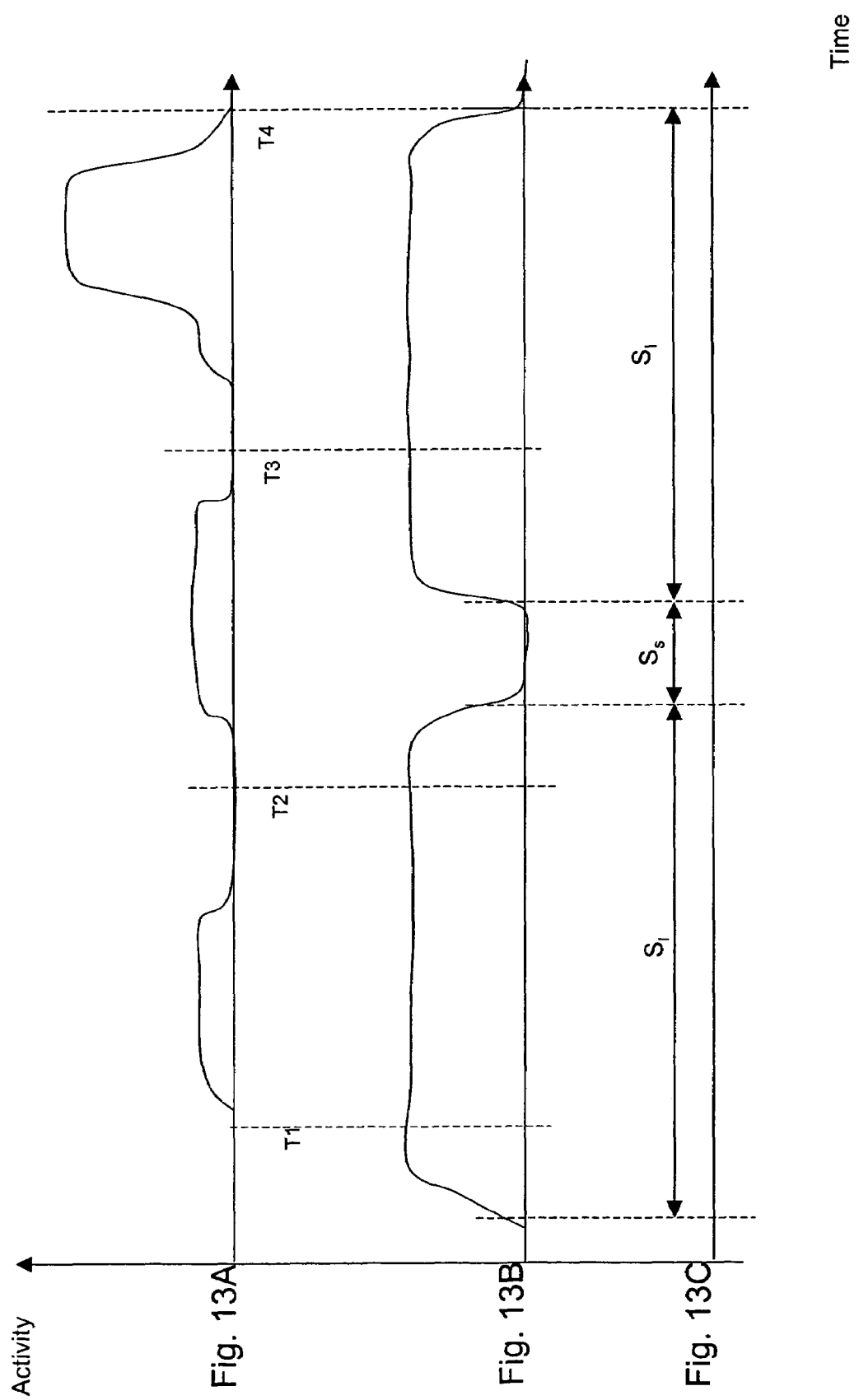

PROPAGATION OF VIRUSES THROUGH AN INFORMATION TECHNOLOGY NETWORK

FIELD OF INVENTION

The present invention relates to the propagation of viruses through a network of interconnected processing entities.

BACKGROUND ART

In current network environments virtually any processing entity (or "host") is at one time or another connected to one or more other hosts. Thus for example in the case of an IT environment, a host in the form of a computer (such as a client, a server, a router, or even a printer for example) is frequently connected to one or more other computers, whether within an intranet of a commercial organisation, or as part of the Internet. Alternatively, in the case of a communications technology environment, a host in the form of a mobile telephone is, merely by virtue of its intrinsic purpose, going to be connected to one or more other hosts from time to time, and an inevitable result is that the opportunities for the propagation of viruses are enhanced as a result. For example in the case of a computer virus known as the "Code Red" virus, once assimilated within a host the virus operates to generate Internet Protocol ("IP") addresses of other potential hosts at random, and then instructs the host to send a copy of the virus to each of these randomly-generated IP addresses. Although not all of the potential hosts are genuine (since the IP addresses are randomly generated), sufficient of the randomly generated addresses are real addresses of further hosts to enable the virus to self propagate rapidly through the Internet, and as a result to cause a substantial drop in performance of many commercial enterprise's computing infrastructure.

Within the context of this specification a virus is data which is assimilable by a host that may cause a deleterious effect upon the performance of either: the aforesaid host; one or more other hosts; or a network of which any of the above-mentioned hosts are a part. A characteristic effect of a virus is that it propagates either through self-propagation or through human interaction. Thus for example, a virus may act by becoming assimilated within a first host, and subsequent to its assimilation may then cause deleterious effects within that first host, such as corruption and/or deletion of files. In addition the virus may cause self-propagation to one or more further hosts at which it will then cause similar corruption/deletion and further self-propagation. Alternatively the virus may merely be assimilated within the first host and cause no deleterious effects whatsoever, until it is propagated to one or more further hosts where it may then cause such deleterious effects, such as, for example, corruption and/or deletion of files. In yet a further alternative scenario, a virus may for example become assimilated within a first host, and then cause itself to be propagated to multiple other hosts within the network. The virus may have no deleterious effect upon any of the hosts by whom it is assimilated, however the self-propagation through the network per se may be of a sufficient magnitude to have a negative effect on the speed of "genuine" network traffic, so that the performance of the network is nonetheless affected in a deleterious manner. The three examples given above are intended for illustration of the breadth of the term virus, and are not intended to be regarded in any way as exclusively definitive.

It has been established that in situations where viruses are likely to cause deleterious effects upon either one or more hosts, or the network infrastructure as a whole, one of the most important parameters in attempting to limit and then to reverse such effects is the speed of propagation of a virus. Human responses to events are typically one or more orders of magnitude slower than the propagation speeds of viruses, and so substantial difficulties are frequently apt to arise within a network before any human network administrator is either aware of the problem, or capable of doing anything to remedy it. Therefore any reduction in the initial rate of propagation of a virus through a network is likely to be of benefit to attempts to limit any negative effects, and/or to remedy them.

One existing and relatively popular approach to tackling the problems of virus propagation within a network may be thought of as an absolutist approach. Viral infection is prevented using virus-checking software, attempts to check all incoming data, for example email attachments. If subsequently a virus is discovered within a host, that host is typically removed from the network immediately, and disinfected once the nature of the virus has been established. In accordance with this philosophy each host may be thought of as contributing to protecting the network against widespread infection firstly by avoiding incidence of infection, and secondly in the event of infection, by its sacrificial removal from the network.

SUMMARY OF THE INVENTION

The present invention provides improvements to an alternative approach to infection and propagation of viruses in a network of hosts. According to a first aspect, the present invention provides a method of restricting propagation of viruses in a network having a plurality of hosts, comprising the steps of: monitoring network activity of a first host of the plurality and establishing a first record which is at least indicative of identities of hosts within the network contacted by a first host; limiting contact of the first host to other hosts within the network over the course of a first time interval, so that during the first time interval the first host is unable to contact more than a predetermined number of hosts not in the first record; wherein the method further comprises an additional selection process for determining which hosts of the plurality the first host is allowed to contact.

BRIEF DESCRIPTION OF THE DRAWING

Embodiments of the alternative approach to infection and propagation of viruses will now be described, along with embodiments of the invention, by way of example, and with reference to the accompanying drawings, in which:

FIGS. 12A and B are flow charts illustrating the operation of further aspects of a method;

FIGS. 13A-C illustrate a method according to a further embodiment; and

DETAILED DESCRIPTION OF THE DRAWING

Figure 1:
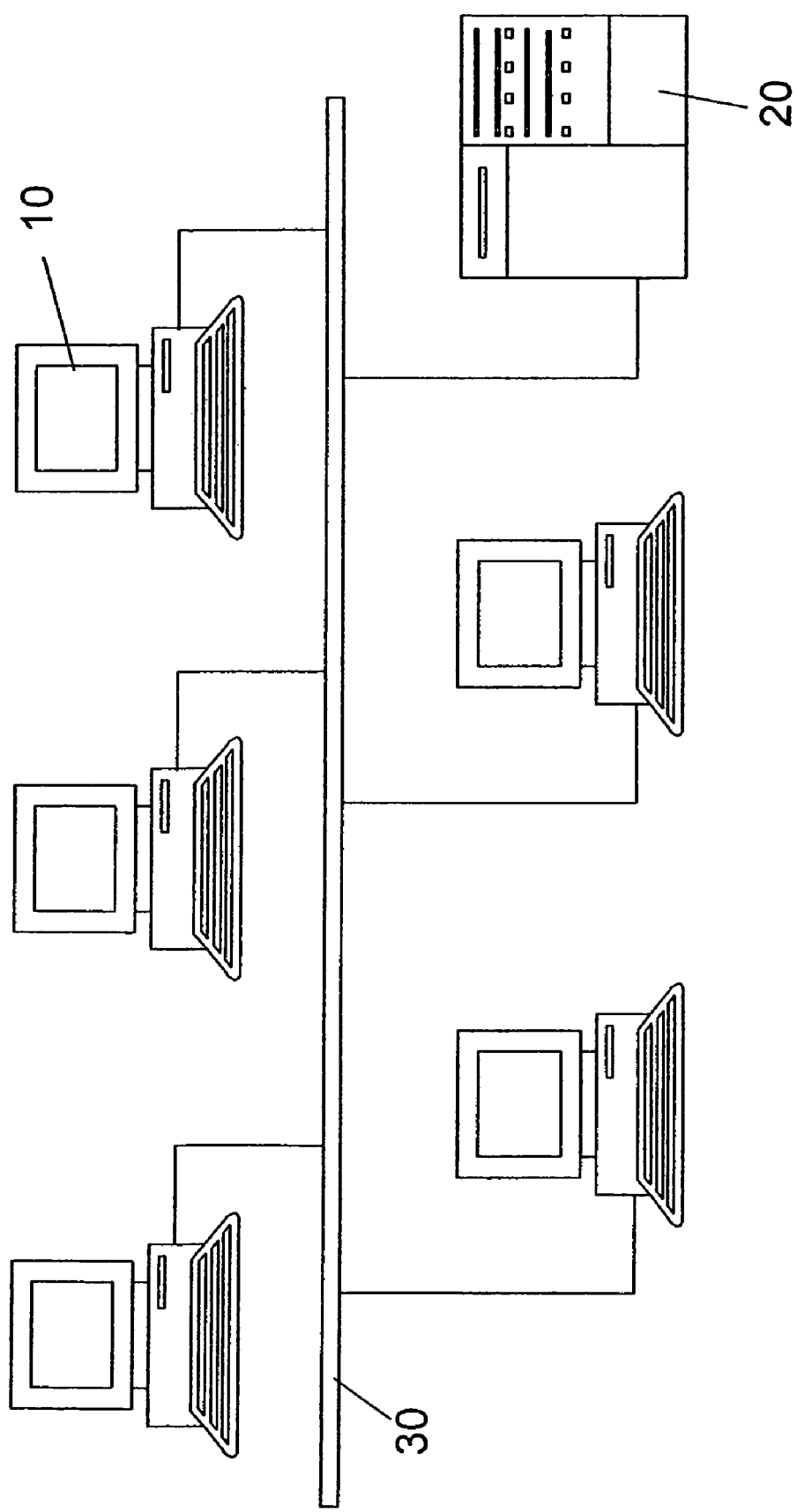
FIG. 1 is a schematic representation of one form of network architecture.
Figure 2:
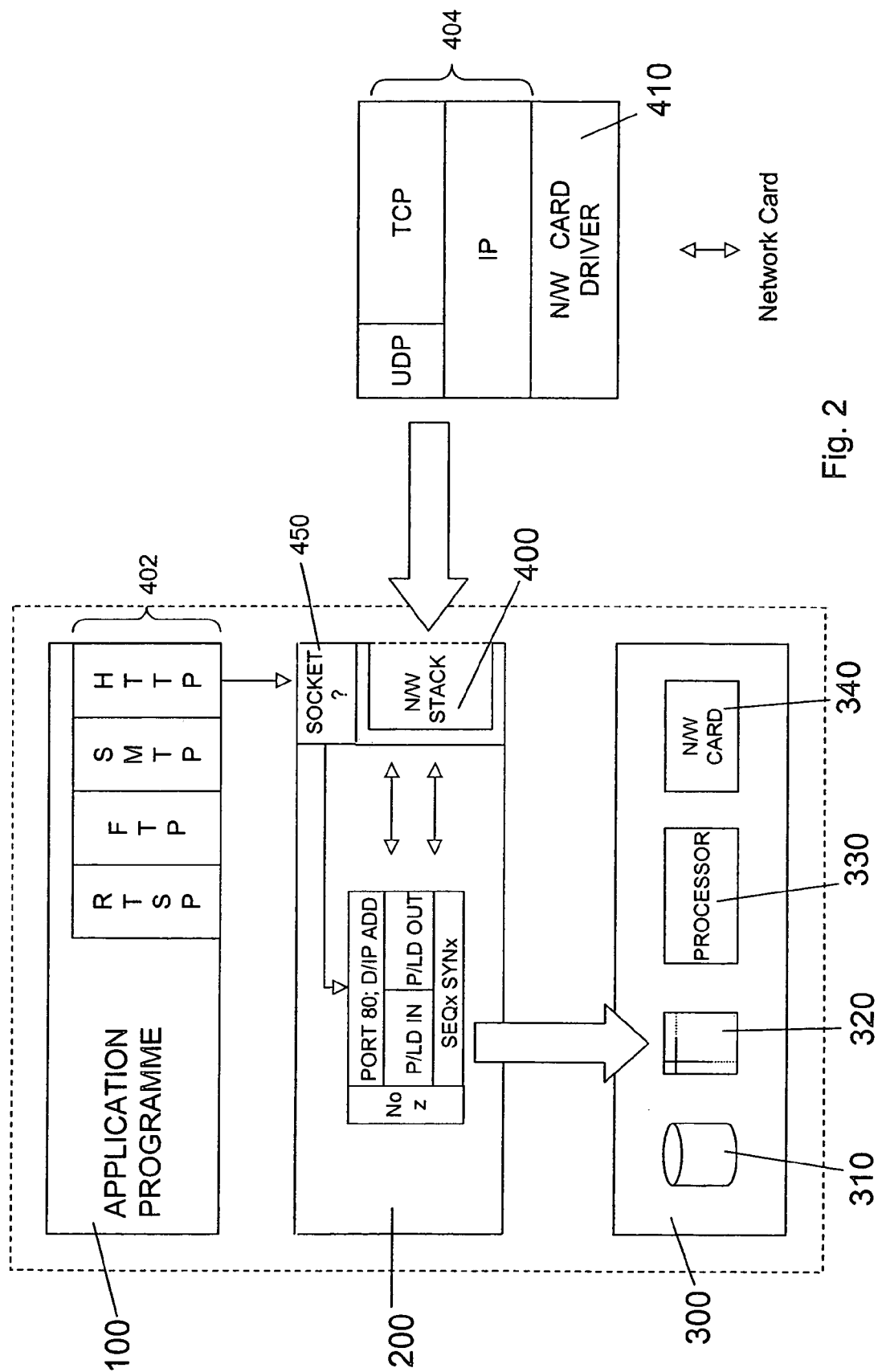
FIG. 2 is a schematic illustration of the conventional operational architecture of a computing entity forming a part of, for example, the network of FIG. 1.

Referring now to FIG. 1, one typical form of network includes a plurality of client computing entities 10, and a server computing entity 20 each of which is connected to a network backbone 30. In the present example, each of the computing entities has a similar architecture enabling dispatch and receipt of data from other entities connected to the network. Referring now to FIG. 2, each of the entities includes what may be thought of as three functional parts: one or more application programs 100, which in general terms may be thought of as enabling performance of a particular task that a user of the entity may wish to perform, such as browsing the Internet, word processing and so on; hardware 300 (such as a hard drive 310, memory 320, a processor 330, and a network card 340); and an operating system 200. The operating system 200 may be thought of, in part, as an interface between the applications programs and the hardware, performing scheduling of tasks required by applications programs, and allocates memory and storage space amongst other things. The operating system 200 may, in accordance with this way of describing the architecture of a computing entity, also include a hierarchy, or stack 400 of programs which provide the entity in question with the ability to dispatch and receive data to and from other entities in the network, in accordance with a number of different sets of formal rules governing the transmission of data across a network, known as protocols. The network stack 400 may be thought of as being inserted into the operating system so that the two operate in conjunction with each other. The stack 400 includes a strata of low level programs which provide for the implementation of low level protocols 404, concerned for example with the formation of bundles of data known as "packets" (which will be discussed in more detail later), the order in which bytes of data are to be sent and, where appropriate, error detection and correction. A further, high level strata of protocols usually implemented within applications programs ("application protocols"), apply in conjunction with the low level protocols to provide for the dispatch and receipt of data at the behest of applications programs. In the present example the application program uses four different high level protocols 402; RTSP (real time streaming protocol), FTP (file transfer protocol), SMTP (simple mail transfer protocol—used for email), and HTTP (hyper text transfer protocol—used primarily in internet related applications), and the operating system implements two low level protocols 404: UDP (User Datagram Protocol for use with RTSP), and TCP (Transfer Control Protocol for use with the remaining three application protocols), both low level protocols being implemented above, and in conjunction with Internet Protocol (IP). Finally, the network stack 400 includes a system program known as a driver 410 for the network card, which in essence is low level software that controls the network card.

In the present illustrated examples, the process of establishing a connection in accordance with HTTP will be considered. Usually a request for such a connection is made by the web browser application program, and this in turn is most likely to be at the behest of a user operating the web browser. Where this is the case, the request will identify the address or "URL" within the network of the computing entity with which a connection is sought, initially using alphanumeric characters entered at the address bar of the browser application program. Ultimately however these are "resolved" into a numerical "IP address" of the form: xxx.xxx.xxx.xxx, where xxx is an integer between 0 and 255 inclusive. An example of an IP address is 192.168.2.2. The IP address is subsequently further resolved into what is known as a physical, or Media Access Control ("MAC") address of the network card of the destination computing entity. Resolution of the URL into an IP address, and the IP address to a MAC address usually takes place at dedicated computing entities within the network, in a manner which is well known per se, and will not be described further herein. This description of the connection process in accordance with HTTP, well known per se, has described connections legitimately requested by a user, and by means of a URL. However it should be appreciated that it is possible for example to request a connection from the web browser application program using an IP address, rather than the alphanumeric characters of the URL. This is an aspect of the system behaviour which has been exploited by viruses, some of which randomly generate IP addresses in accordance with the rules governing their allowable format, and then seek connection to those randomly generated addresses.

Figure 3:
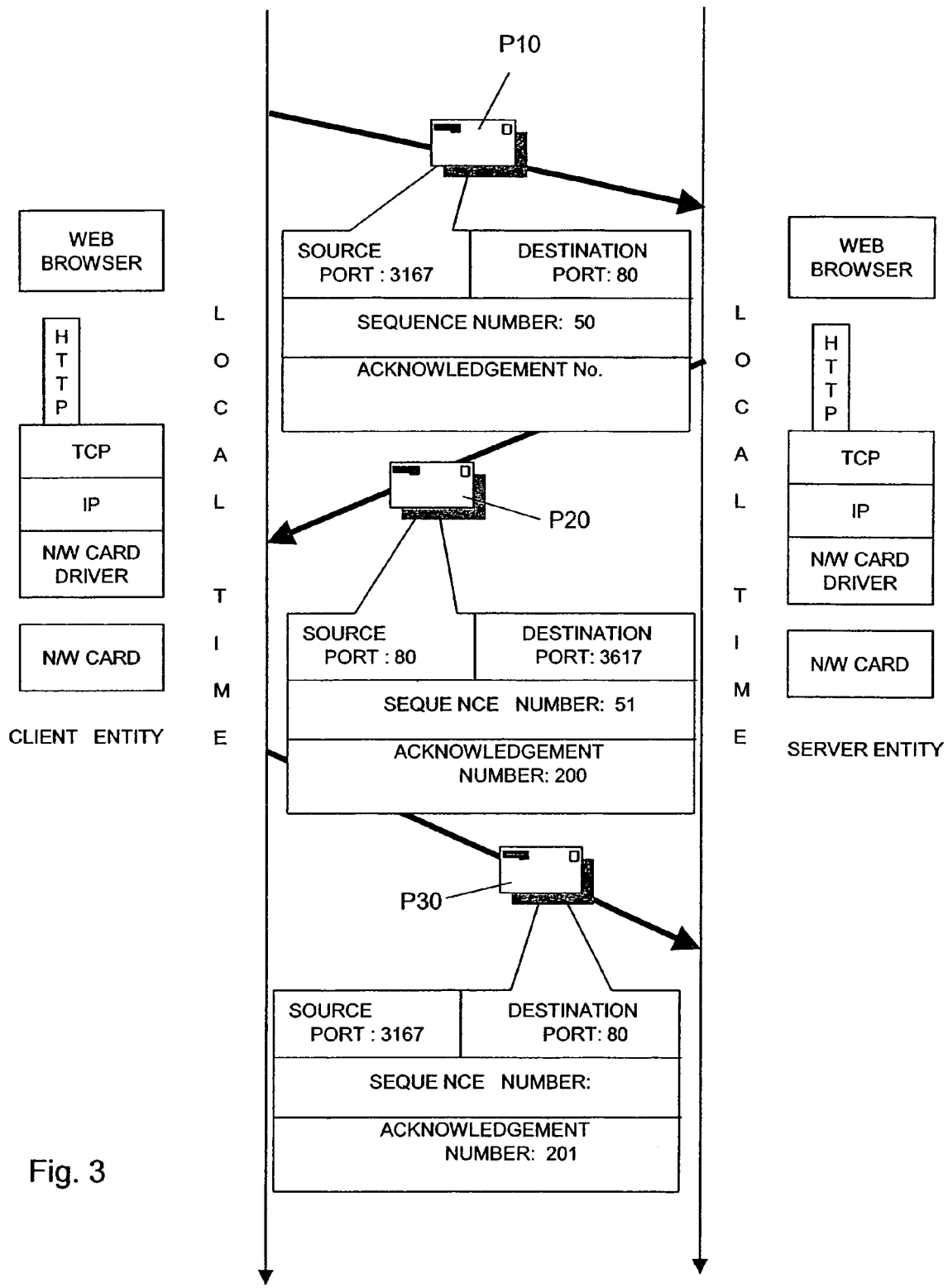
FIG. 3 is a schematic illustration of establishment of a connection in accordance with an application protocol from FIG. 2.

In the context of the present application it should be appreciated that the term "connection" is a term of art, and is used to refer to a manner of transmitting messages in which acknowledgement of receipt of data is required, so that in the absence of an acknowledgement the connection is deemed either not to have been established, or to have failed, and the transmitted message deemed not to have arrived. One application protocol which operates using connections is HTTP, and an example of the establishment of a connection in accordance with HTTP will now be described with reference to FIGS. 2 and 3. A connection in accordance with HTTP is typically established at the behest of a web browser application program (i.e. a program in the applications layer 100 in FIG. 2) within the client entity, which requests a connection with a server entity, for example. When an application program such as a web browser seeks to establish a connection with another computing entity, it initially requests what is known as a socket 450 from the operating system. A socket is effectively an allocated memory space in which data relating to the communication sought by the web browser (in this instance) is stored. Upon receiving a request for a socket, the operating system duly creates or "opens" one (which in effect means that memory is allocated), and returns a socket number, which is the identifier for that particular socket. In FIG. 2 the particular socket is indicated by reference numeral 450, and the number of the socket is "z", while the part of the operating system which allocates the socket is shown as a "layer" above the network stack, by which it is sought to indicate that, from a methodological perspective, use of the socket (further uses of which will subsequently be described) in the case of outgoing data, precedes the passage of data from the application program through the network stack. Once a socket has been opened, the web browser then requests that the socket z is "bound" firstly to the IP address with which a connection is sought, and secondly is a parameter known as the "port" number (which is essentially a label identifying the application protocol used), by writing these parameters in the socket (which in due course will additionally contain further data). The port number for connections via HTTP is usually port 80. Once a socket has been created and bound the browser then requests that a connection be established, and this causes the emission of what is known as a data packet P10 (shown in FIG. 3) to the destination computing entity. The requesting packet P10 contains: an identification of the destination port, i.e. an identification of the suitable application protocol for handling messages transmitted over the requested connection (here, because the connection is established in accordance with HTTP, port 80); a source port (here 3167) which is an arbitrary number (but one which is not: (i) already in use at that time, and (ii) not already allocated as a standard number to define a port identified in accordance with established standards) whose purpose is to provide, to the client requesting the connection, an identification of the connection in acknowledgement messages (e.g., since it is entirely possible that there may simultaneously be two are more connections using the same protocol this may be used to distinguish one such connection from the other); a flag indicating that the synchronisation status of the requesting entity is set to "on" (meaning that sequence numbers—which indicate the order of the packet in a total number of packets sent—between the requesting and destination computing entity are to be synchronised), and an initial sequence number 50 (this could be any number). Upon receipt of this packet, the destination machine sends back a packet P20 identifying the source port as 80, the destination port as 3167, a flag indicating that the acknowledgement status is "on", an acknowledgement number 51 which augments the sequence number by one, and its own synchronisation flag number 200. When the requesting entity receives this packet it returns a further packet P30 once again identifying the source and destination ports, and a flag indicating that its acknowledgement status is on, with an acknowledgement number 201 (i.e. which augments the sequence number by one). Once this exchange is complete, a connection between the client and server entities is defined as being open, and both the client and server entities send messages up through their respective network stacks to the relevant application programs indicating that a connection is open between them. In connection with the socket, it should also be noted that the socket comprises an area 460 allocated to store the actual body of the message which it is desired to transmit (sometimes known as the outbound message content, or the outgoing payload), and similarly a further area 470 allocated to store the body of messages which are received (inbound message content, or incoming payload).

When the outgoing payload is to be transmitted, the TCP layer breaks it up into packets (i.e. data structures such as those illustrated above in FIG. 3, but further including at least part of the payload), and the IP layer attaches an IP address header. When an incoming message arrives, it passes up through the network stack, i.e. from the network card 340, up through the Internet Protocol software, etc., and is written in to the relevant socket (as identified, inter alia from the port number), from which the application program retrieves the incoming payload.

Data may alternatively be transmitted using the protocols RSTP/UDP/IP (indicating the hierarchy of protocols in the network stack adopted in conjunction with each other to transmit the data) which do not require a connection; the dispatching entity sends a packet to the destination entity, and does not require an acknowledgement of receipt.

Figure 4:
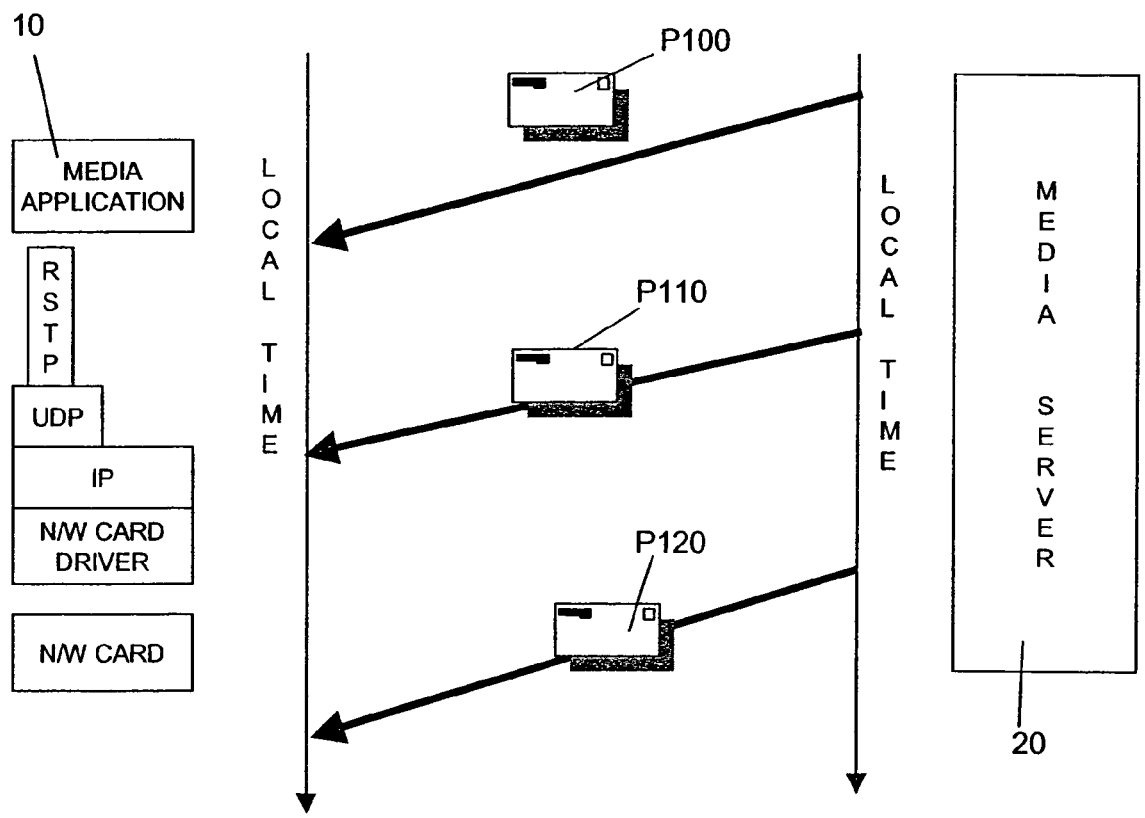
FIG. 4 is a schematic illustration of data transmission in accordance with a further application protocol from FIG. 2.

Referring now to FIG. 4, when transmitting data in accordance with RSTP/UDP, media for example is streamed to a client entity 10 from a media server 20 in a series of packets P100, P120, P120 . . . , and the client does not acknowledge receipt of any of them. Streaming in accordance with this protocol typically follows an initial request to establish a connection between the client and the server by some other connection based protocol, for the purpose of identifying a destination port on the client, amongst other things.

Figure 5:
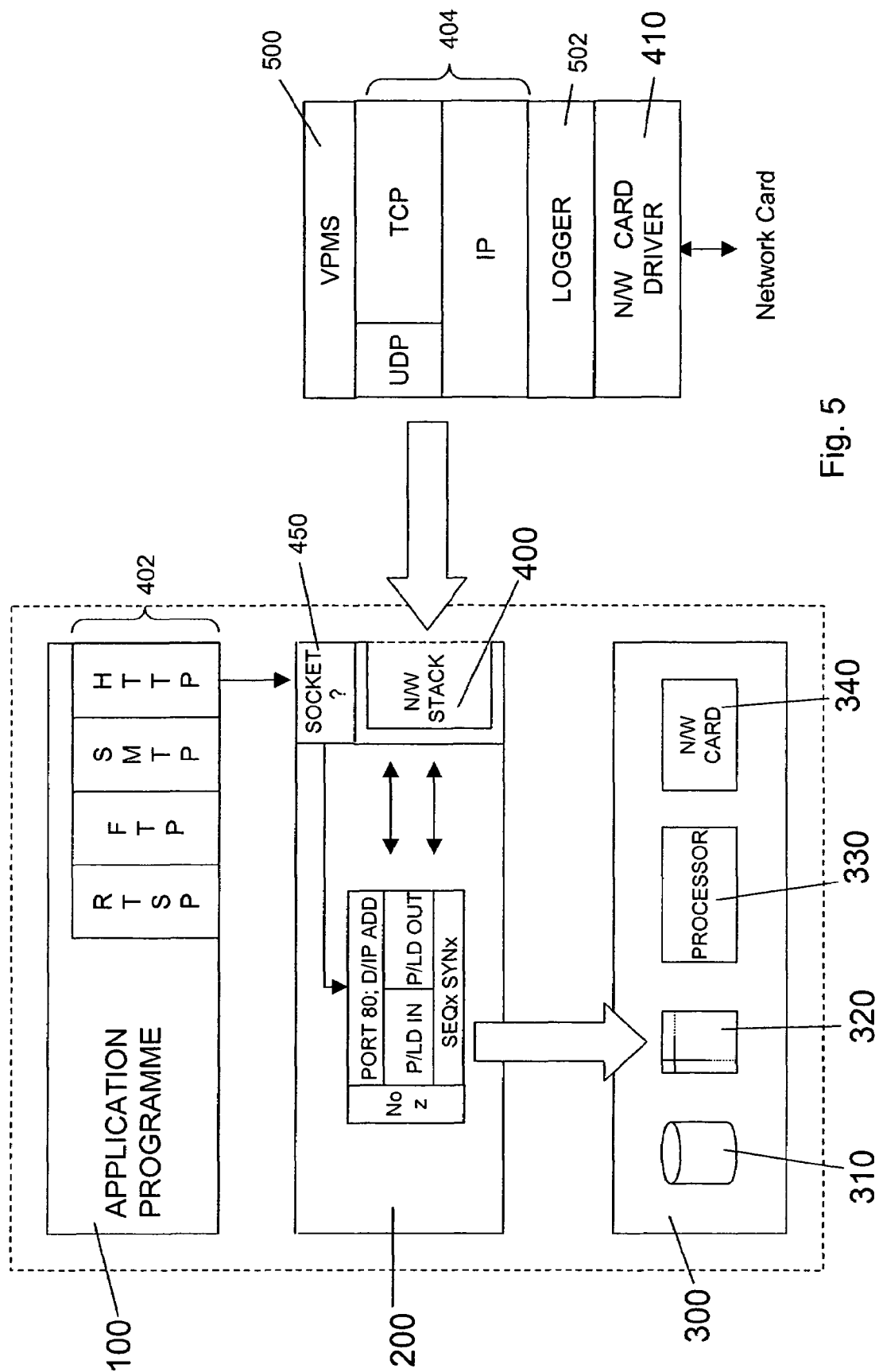
FIG. 5 is a schematic illustration of an operational architecture according to an embodiment of the present invention of a computing entity forming a part of a network.

Thus far all that has been described is entirely conventional. Referring now to FIG. 5, in accordance with a first embodiment of the present invention, a layer of viral propagation monitoring software (VPMS) 500, runs within the network stack of one or more machines within the network. The VPMS acts as a gateway for all outbound data from the computing entity on which it is running, and operates to monitor the propagation of viruses within the network by observing what is, in accordance with a predetermined policy, defined as "unusual" behaviour in contacting other entities (also known as "hosts", since they may act as hosts for viral infection) within the network. It has been established by the present inventors that in many networks, normal network traffic (i.e. non-virally related) is characterised by a relatively low frequency of events in which data is sent to destination hosts (i.e. hosts which are the intended destination for data) within the network which have previously not been contacted. In contrast, virally-related traffic is often characterised by a relatively high frequency events in which data is dispatched (or attempts are made to dispatch data) to previously uncontacted destination hosts. Broadly speaking, the function of the VPMS is to monitor abnormal and therefore possibly virally-related traffic, as defined in accordance with a predetermined policy, and to record such abnormal traffic.

In the present example the VPMS operates upon the basis of a series of time intervals or time windows, which in the present illustrated example are of predetermined and constant length $T_n$. In any given time window $T_n$ the VPMS monitors requests to send data to "new" destination hosts, i.e. destination hosts whose identities differ from those specified in a record of identities of destination hosts most recently contacted. The record only holds a predetermined number N of destination host identities, so that a destination host is classified as new if it is not one of the N most recently contacted destination hosts. The number of new hosts allowed per time window, and the value of N are determined on the basis of the policy, typically defined by a system administrator, and the policy is preferably formulated to take account of the nature of non virally-related network traffic. In this way, the VPMS operates to monitor the speed at which a virus resident on the host may propagate from that host to other hosts within the network.

Referring to FIG. 6A, over the course of a time window T1, various applications programs running on the workstation send requests via the VPMS to send data (whether by connection or otherwise) to other hosts within the network ("outbound requests"): the email application program, which requests dispatch of an email message (having multiple addressees) to a mail server, Mail (Request A) using SMTP, the file management application program requesting dispatch of a file recording a text document to another user (Request B) via FTP, and the web browser program which requests connection, (typically via a Web Proxy server), W/Server in order to connect to a site using HTTP (Request C). In the present example, outbound requests to the VPMS from each of these hosts are requests to send data to an identified destination host, and are ultimately manifested by the dispatch of one or more data packets in accordance with the relevant application protocol. The term "request" is intended to be interpreted broadly to encompass any indication (usually from an application program, although by no means necessarily) that contact with a destination host is sought, and for ease of terminology, the transmission of a request is to be interpreted as indicating that data is transmitted pursuant to a request to transmit such data.

Figure 6:
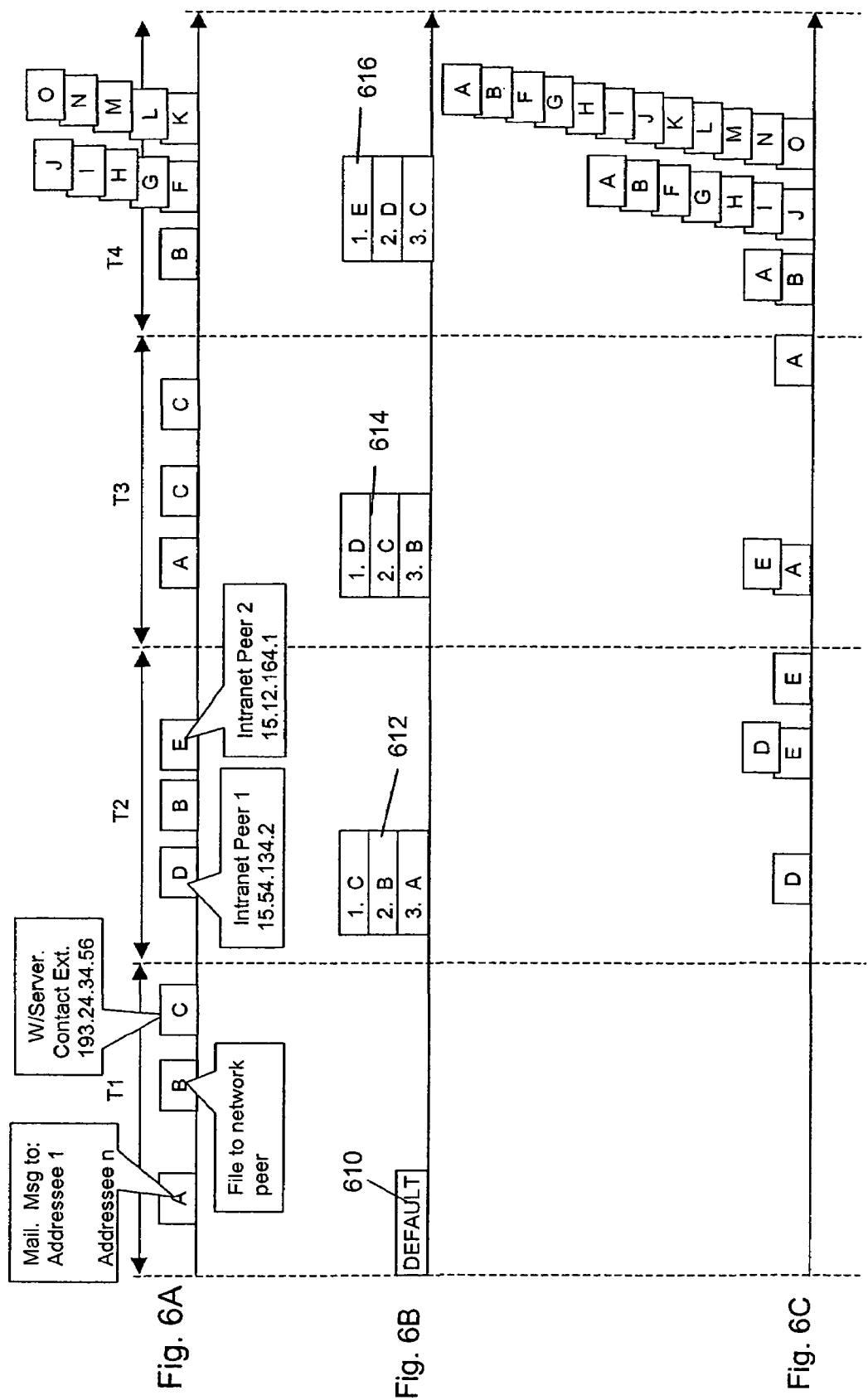
FIGS. 6A-6C, together, are a graphical representation of the operation of a method according to an embodiment.

The VPMS operates in accordance with a routine illustrated in FIG. 7, whose features will now be described in more detail in conjunction with FIGS. 6A-C, although FIG. 7 should be regarded as a generic illustration of the operation of the VPMS routine, rather than a specific illustration of individual events depicted in FIG. 6. As explained above, the VPMS operates with reference to a series of time intervals, or windows, which in the present example are of constant length. The routine is initiated at step 702 by a clock (typically the clock which defines the time windows) indicating that a time window has commenced. At step 704 the routine then updates a dispatch record, which is a record of the identities of a predetermined number N (which in this example is 3) of destination hosts most recently contacted (in accordance with the policy—see later) in the previous time window are stored (and which are shown for each time window in FIG. 6B). At this point the routine is effectively in a waiting mode until a request to send data is received at step 706 (a dotted arrow from step 704 indicating that receipt of request occurs temporarily after step 704 but is not consequential to its occurrence). This is a step whose occurrence is entirely outside the control of the VPMS since it usually is initiated at the behest of an application program, as is the case with Requests A, B and C. Each of these requests passes through the relevant application protocol layer in the network stack from the respective application program by which they were generated, to the VPMS, and this event is labelled in FIG. 7 as step 706. Step 706 may be thought of as a triggering event, so that when a request passes into the VPMS, the identity of the requested destination host specified in the request is matched with the dispatch record. This matching process therefore determines whether the requested destination host is a new host, and is represented at step 708. In the present example, somewhat artificially, but nonetheless serving to illustrate the desired principles, the time interval T1 is the first time interval after start-up of the computing entity. The VPMS therefore matches the destination host identities for each of the Requests A-C against identities held in a "default" dispatch record 610 for the time period T1, which may be (and in the illustrated example, is) simply a record of the three hosts most frequently contacted during the lifetime of the host on which the VPMS is running. In the present example the three most frequently contacted hosts, and therefore the three identities retained in the default dispatch record are those of the mail server (Request A), the file server (Request B) and the web proxy server (Request C). Since each of the three outbound requests from the workstation during the time period T1 identify a destination host matching one of the three host identities in the default dispatch record, and therefore none of the Requests is seeking to establish contact with a new destination host, the VPMS therefore takes no action and simply ends at step 710.

During the course of the second time interval T2, three further outbound requests are received, identifying host destinations "Intranet Peer 1" (Request D), Request B (described above) and "Intranet Peer 2" (Request E) are received. As in the previous time window, as each request triggers an individual VPMS routine for that request, i.e. a step 706 as it passes through the VPMS, and is followed by the step 708 of matching the identity of the host destination in the request with the identities present in the dispatch record 612 for this time window T2 is performed in order to establish whether the request is new. The dispatch record however is now a genuine record of the identities of the three hosts contacted most recently during the previous time window T1 (although coincidentally this is identical to the default dispatch record). Upon receipt of Request D, the consequently triggered VPMS routine for that request establishes at step 708 that the identity of this host is not in the dispatch record 612, i.e. that it is a new destination host. It therefore proceeds to step 712, where it adds a copy of the Request D as an entry to a virtual buffer whose contents are shown in FIG. 6C, and then ends at 710. In one preferred embodiment, the entire contents of the socket relating to Request D are duplicated to form the entry in the virtual buffer. However in an alternative embodiment, where for example the payload is large, this is omitted. On receipt of Request B, the VPMS establishes at a step 708 that B is present in the dispatch record, and so the VPMS routine ends at step 710. Request E is also a new request within the time window T2 and so at a step 712 the identity of host E is added to the virtual buffer.

Figure 7:
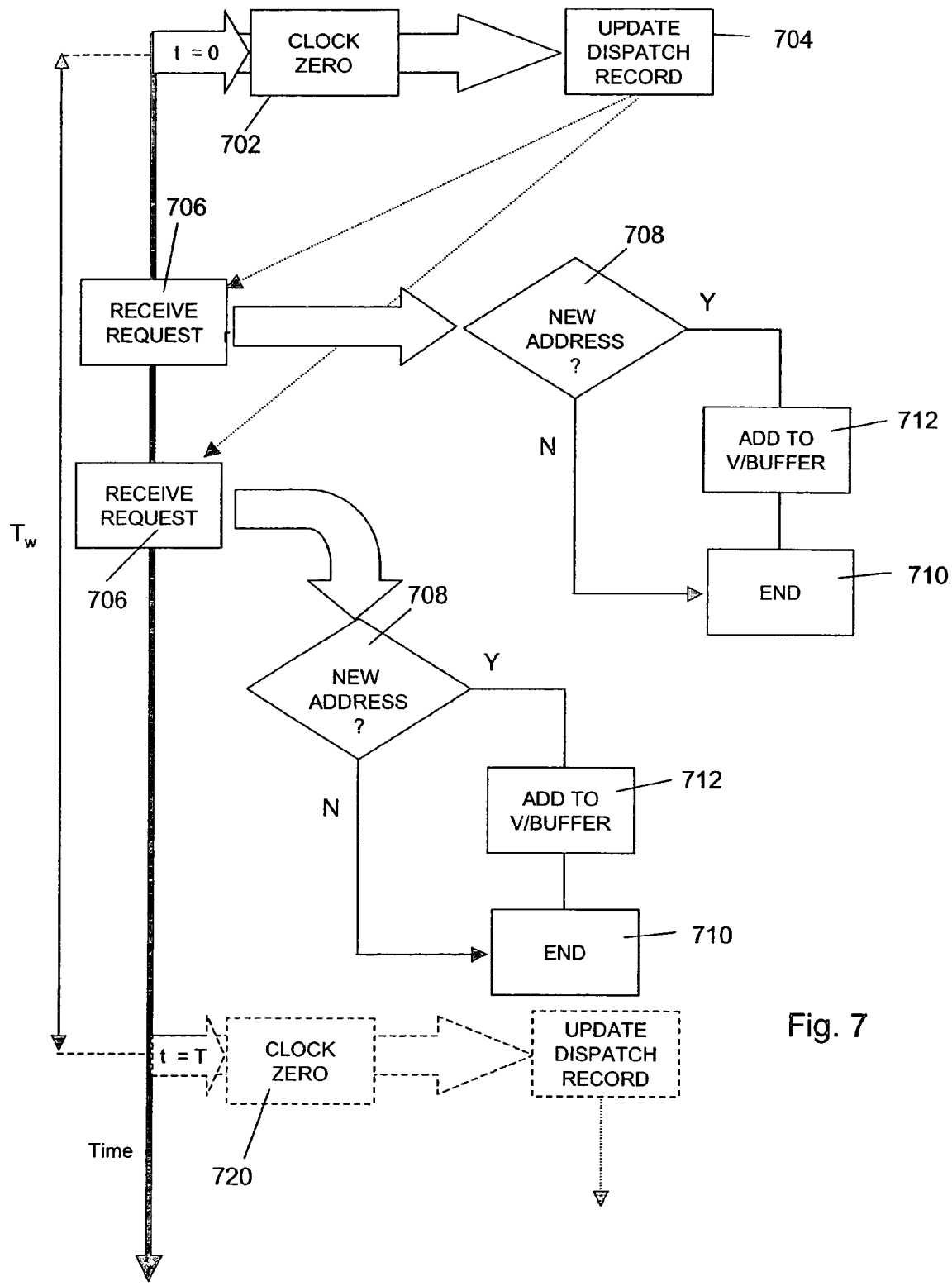
FIG. 7 is a flowchart illustrating the operation of the method of FIG. 6.

Because receipt of requests are the trigger for the commencement of the routine illustrated in FIG. 7, neither the number of occasions in a given time window in which the VPMS routine is run, nor the timing of their commencement can be known in advance. Additionally, as illustrated in FIG. 7, it is possible for two (or indeed more, although only two are illustrated in FIG. 7) routines to be running in temporal overlap, since one may still be running when another is triggered by a further request. Similarly, a request may trigger the execution of the routine of FIG. 7 just prior to the end of a time window (a situation also illustrated in FIG. 7, with steps which occur at the end 720 of a time window/the beginning 702 of a subsequent time window being shown in dashed lines), so that the execution of the routine may overlap temporally with a part of the next time window. The approach taken by this particular embodiment to this issue of overlap is relatively simple: if at the commencement of time window $T_n+1$, the update of the dispatch record for a previous time window $T_n$ has been completed during the simultaneous running of a VPMS routine commenced in the previous time window $T_n$, but prior to execution the step 712 (adding a request to the virtual buffer) for that routine, the subsequent update of the virtual buffer in that step 712 will be treated as if performed for a request received in the current time window $T_n+1$. This approach has the benefit of being simple, although it may on occasions yield minor inaccuracies, with a request being recorded as being outside of the policy simply because processing of the request received and initially processed during one time window extended into the next time window, but this is not significant overall.

At the end of the time window T2, the virtual buffer contains two new requests. At this juncture (i.e. at end of time period T2), the policy which the VPMS is designed to monitor comes into play. In the present example, the policy provides that a single new host may be contacted per time interval. This element of the policy is monitored by a first buffer management routine, which is illustrated schematically in flowchart form in FIG. 8A, and begins at step 802 with the advent of a clock timeout, that is to say that the clock (not shown) which defines the time intervals $T_n$ has completed another time period, following which, at step 803 the routine counts the number of requests in the virtual buffer to update the variable known as LogNo, this being the number of entries (each identifying a request) in the virtual buffer at any moment. At step 804 the routine determines whether there are any entries in the virtual buffer, and it does this by examining the value of LogNo, to determine whether it's greater than 0. If there are no entries in the virtual buffer the routine ends at step 806. In the present illustrated example however it can be seen that over the course of the time interval T2 entries for two requests, D and E have accumulated in the virtual buffer, and so the routine proceeds to step 808, at which the entry for the first request RQ1 (i.e. the one which has been in the buffer for the longest time) is deleted from the buffer. Optionally, at step 810, the routine then searches the buffer for other entries specifying the same destination host and deletes any such entries, since they are effectively regarded as one entry identity. Alternatively, step 810 can be omitted. This is followed at step 812 by updating the dispatch record so that it accurately reflects the identity of the three hosts most recently contacted in accordance with policy. It should be noted that the dispatch record does not therefore necessarily reflect the identities of hosts which have most recently actually been contacted, if requests to these hosts are outside of the policy. For example in this case the destination host of Request E, which although contacted, was not contacted in accordance with the policy of one new destination host per time interval. This updating of the dispatch record can be seen reflected in FIG. 6B, where the dispatch record contains the identities of Requests D, C, B. The final step in the first buffer management routine is the updating of the value of the variable LogNo denoting the size of the virtual buffer, which in this example, following the transmission of the Request D, is one (i.e. the single Request E). Thus, in present embodiment in the same way that the dispatch record is a record of recent requests which have been transmitted in accordance with policy, at the end of each time interval the virtual buffer is effectively a record at any instant of requests which have been transmitted outside that policy.

One role of the virtual buffer is to enable a determination to be made with regard to whether the host upon which the VPMS is running is virally infected. One way in which this can be manifested is the size of the virtual buffer. A state of viral infection may therefore be defined in terms of the size of the buffer, and the stage of any such viral infection by the rate of change of the buffer size. This follows from the generally different behaviour of virally-related and non virally-related network traffic, in that non virally-related or "legitimate" network traffic usually involves contacting only a relatively small number of new destination hosts, whereas, because viruses tend to propagate by transmission to as many disparate destination hosts as possible, an instance of a large number of requests to contact a new destination host will typically be indicative of viral infection. The virtual buffer may be thought of as a queue of virtual new requests waiting for opportunities to be virtually transmitted in accordance with policy (since their "counterpart" real requests are simply transmitted without hindrance). The size of the virtual buffer is therefore one indication of whether there is viral infection, since a large buffer size is indicative of a large number of requests to contact a new host within a short space of time. An alternative indication of viral infection may be the existence of an increasing buffer size. Conversely, generally speaking a buffer size which is steadily declining from a relatively high value may be indicative of a temporary increase in legitimate traffic levels. It can be seen therefore that buffer size may be used to interpret the existence of viral infection with varying levels of complexity, the interpretation typically being something which is defined in the policy.

Figure 8A:
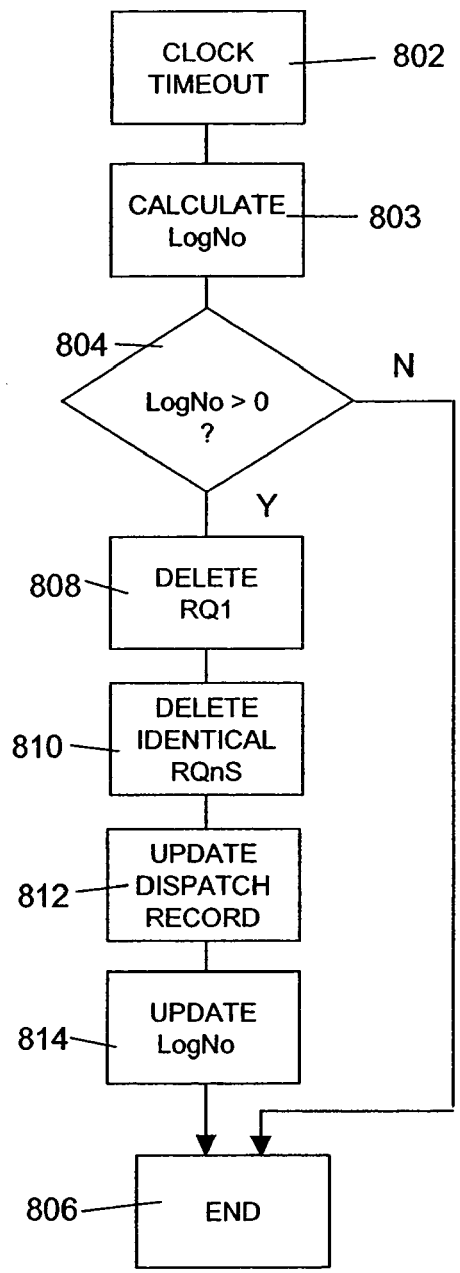
FIGS. 8A and B are flowcharts illustrating further aspects of embodiments of methods.
Figure 8B:
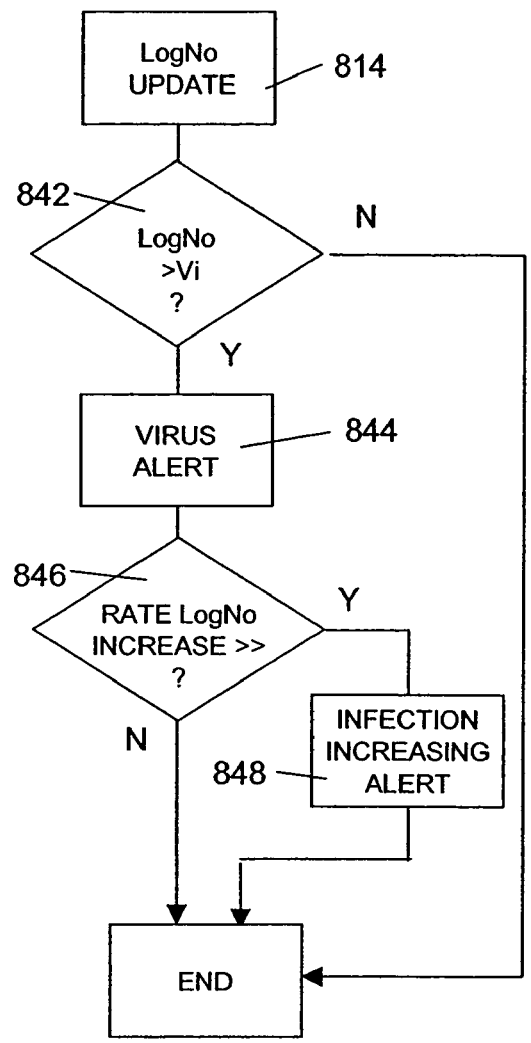

A second buffer management routine, illustrated in FIG. 8B monitors the virtual buffer, and is triggered by performance of step 814 from the routine of FIG. 8A, or from step 803, or from step 712 in FIG. 7 i.e. an update in the value of the variable LogNo. Following which, at decision step 842, the routine determines whether the size of the buffer is greater than a quantity $V_i$, which the policy has determined represents viral infection, whereupon at step 844 it generates a virus alert. This may simply be a visual alert to a user of the workstation 10, or a message to the network administrator, or both, or even a trigger for automated action to shut the network down, as desired. At step 846, the routine determines whether the variable $V_i$ is increasing above a given rate, and if it is, issues a further warning indicating the onset of viral infection at step 848, following which the routine ends.

A situation in which the second buffer management routine generates a viral infection warning can be seen in FIGS. 6A-C. As mentioned previously, during time interval T3, a single Request A (which it will be recalled from the time interval T1 is to contact the mail server), and two Requests C are received. Because the dispatch record 614 for this time interval does not contain Request A, it adds the identity of host A to the virtual buffer, but not the identify of host C. At the end of the time interval T3 the virtual buffer therefore contains Request E (stored in the virtual buffer since time interval T2) and Request A. Since only one new request is transmitted per time window in accordance with policy, and since Request E has been in the virtual buffer since time interval T2, whereas Request A has just been added, Request E is deleted from the virtual buffer (a process with may be thought of as "virtual transmission"), so that at the start of time interval T4 the virtual buffer contains only Request A. This indicates that at this point in time, since startup of the entity on which the VPMS is running, only one more request has been transmitted than the policy allows. The first Request for connection in time interval T4 is Request B, which illustrates that over the course of three time intervals, during which only normal network traffic has been transmitted, connection has only been requested to five different destination hosts. However, Request B is nonetheless defined as new because it's not in the dispatch record 616 for time interval T4, and so the identity of host B is stored in the virtual buffer (this action being illustrated at the same point in the timeline in FIG. 6C). After receipt of request B, two groups of five virtually simultaneous requests are received: F-J, and K-O, and since these are also new, their identities are also added to the virtual buffer. Referring specifically to FIG. 6C during time interval T4, it can readily be seen that the virtual buffer has increased from a size of one, to 12, and in accordance with the policy, this is defined as viral infection, since in the present example a buffer size of greater than five generates this alert. Moreover, since the rate of change is positive and rapid (from 1 to 12 in a single time interval), this is indicative of the onset of infection. Thus the likelihood is that a substantial number of the requests transmitted during the course of time interval T4 have been virally related.

In the event that a viral warning is generated, various further actions may then be taken, the majority of which are directed toward finding out more about the nature of any possible virus. Specifically the type of information sought may typically include: the destinations to which a virus has been propagated, where applicable the application program or programs which it uses to propagate itself, and the action and behaviour of the virus. The nature of the information which may obtained directly from the virtual buffer, or which may be deduced therefrom depends to an extent upon the nature of the data stored in the virtual buffer, and the operating system of the host concerned. For example in the case of one preferred embodiment in which the virtual buffer simply copies the socket, including payload, the destination host will be recorded in the buffer, and possibly, in the case where the virus copies itself to the socket as the outgoing payload, also the virus. Additionally, where the operating system records an identifier in the socket denoting the application program requesting the socket, and an ability to map this process identifier to the requesting application program after the socket has been closed (remembering that the virtual buffer contains a copy of the socket, while the actual socket is transient since it is used to carry out the request to send data and is then deleted), then the application program responsible for requesting data transmission can be identified. The use of the data in a socket is only one way in which to collect data relating to possible viral infection, and when using sockets, depending upon the extent of the data collected, the reliability of copying of the sockets is likely to vary. For example, if, as referenced above, the fullest data (including e.g. copies of the payload) is to be retained, further copies of the sockets in the virtual buffer (stored for example in a manner which tags them to the copy of the socket in the virtual buffer) are preferably made over time as the contents of the socket changes over time. However, because two functional elements within the host may cause a change in the data in a socket (e.g. the writing of outgoing data to a socket by an application program, and removal from the socket of outgoing data by the network stack), maintaining a complete record may nevertheless still be difficult simply from observing the contents of sockets.

In an alternative embodiment, the network stack additionally includes a layer 502 (illustrated in FIG. 5), known as a packet logger, known per se. According to one embodiment, when a viral warning is generated as a result of the virtual buffer size (the virtual buffer this embodiment still being made of a single copy of a socket), the logger 502 is switched on, and makes copies of outgoing packets. These may be all outgoing packets, or packets identified by one or more particular destination IP address, the identity of which may for example be established from the copies of the sockets in the virtual buffer. By logging packets complete information may be stored relatively easily, since, for example even in the case of large payloads, the individual packets carrying various parts of the payload may easily be aggregated using the SEQ and ACK numbers. Further, if desired, the use of the logger enables incoming packets from designated IP addresses to be logged, which may provide valuable information in circumstances for example where a virus has a "hand-shake" action with another host (i.e. sends back a packet to its originating host from a destination host) as part of its propagation process (as is the case, for example with the Nimda worm).

The relatively early provision of warning of viral infection is potentially extremely beneficial, since in the case of many viruses the rate at which they can establish infection accelerates over time. For example, in the case of the code red virus, it has been established that over the course of the first 16 hours, 10,000 hosts were infected, but that in the subsequent 8 hours the virus infected a further 340,000 hosts. The early collection of data on viral infection can thus enable action to be taken, either within the hosts within which infection has been detected, and/or within other hosts, which can substantially reduce the extent of subsequent infection.

In the scenario illustrated in connection with FIG. 6, a single outbound request (Request A) to the VPMS, specifying a single destination host, namely the mail server, actually contains a plurality of email messages to different specified addressees. This outbound request may therefore be thought of as a carrier request for a plurality of sub-requests, here having the form of putative email messages intended for dispatch from the mail server to a list of addressees specified within the outbound carrier request (similarly, the mail server may be thought of as acting as a proxy destination host for the ultimate addressees specified in the outbound carrier request). In this situation, allowing transmission of the data packet constituting the message to the mail server will in fact effectively allow the workstation to contact multiple other hosts within the network (i.e. the specified addressees) all of which may be new, even though, in accordance with the routine described in connection with FIG. 7, the outbound carrier request will only count as a single request which may not even be recognised as new if, as may be likely, the mail server is identified in the current dispatch record. In such a situation therefore, if the VPMS operates simply to record in the virtual buffer those new destination hosts to be contacted per time window on the basis only of those destination hosts which are ostensibly identified in the outbound request, the desired monitoring of viral propagation may be circumvented or reduced, because a single outbound request specifying the mail server does not necessarily represent only a single email subsequently propagating through the network after processing and forwarding by the mail server.

In a modification of the embodiment thus far described therefore, the VPMS includes within its routine a step of identifying the application program by which an outbound request has been generated. Because certain applications programs are more likely than others to use outbound carrier requests which invoke the use of a proxy (for example the above-mentioned instance of email, or the case of a web browser program) it is possible in advance to specify criteria, based on the provenance of an outbound request, identifying those outbound requests likely to be carrier requests. If the packet is generated by one such specified application program, then the VPMS invokes the use of the application protocol concerned to reveal the identities of the destination hosts specified in the sub-requests; here the eventual addressees for whom the email message is intended. Once the identities of the genuine or ultimate addressees have been obtained, there are several options for processing the request. In accordance with one alternative the identities of the destination hosts specified in the sub-request can be regulated in accordance with the same policy which applies to all other requests, and they can be matched against the host identities within the dispatch record in the manner previously described in the embodiment described in the above in FIGS. 6-8. Further was in which multiple-addressee email messages may be handled are discussed below.

Since in the case for example of email, the use of outbound carrier requests to a host acting as a proxy for the ultimate addressees of the email messages is the norm, it is, in a modification, possible for different versions of VPMS to run simultaneously, effectively operating in parallel with each other: one which applies to hosts specified in the outbound request (including carrier requests), and another which applies to hosts specified in any sub-requests identified by the email application program. In such a situation, each VPMS will operate independently on a category of requests which it is intended to process, using its own dispatch record, and carrying out a policy for outbound requests tailored to the traffic it is set up to control, for example in the manner previously described and illustrated in connection with FIGS. 6 and 7. The two policies may be the same (e.g. a dispatch record of 3 identities, a time window of constant duration $T_n$, and one new host per outbound request/sub-request), or different as desired.

The choice of the length of the time window, the number of identities retained in a dispatch record, and the number of new hosts to be allowed per time window are all dependent upon the likely "normal" performance of the network within which the VPMS is operating, and more particularly, the nature of the network traffic the VPMS is intended to control. Therefore, while a policy such as that illustrated in connection with FIGS. 6 and 7 may be effective in monitoring the propagation of viruses through the network to a rate of infection of one new host per time interval, it may also be susceptible to false warnings caused by non virally-related, or "legitimate" network traffic whose characteristic behaviour differs substantially from the policy the VPMS is performing. To ameliorate this difficulty, it is possible to provide a version of VMPS for each application program from which network traffic emanates, with each VPMS performing a policy tailored specifically to minimise the chance of false warnings with legitimate network traffic. Alternatively, in accordance with a further preferred embodiment, an individual VPMS is provided in respect of each application protocol which the hosting entity supports, and requests are routed to appropriate VPMS on the basis of the port identified in outgoing requests from application software.

In a further embodiment, the establishment of a record indicative of the normal traffic destination hosts, may be employed to restrict the propagation of viruses within a network, an example of which will now be described below with reference to FIGS. 9 to 14.

Figure 9:
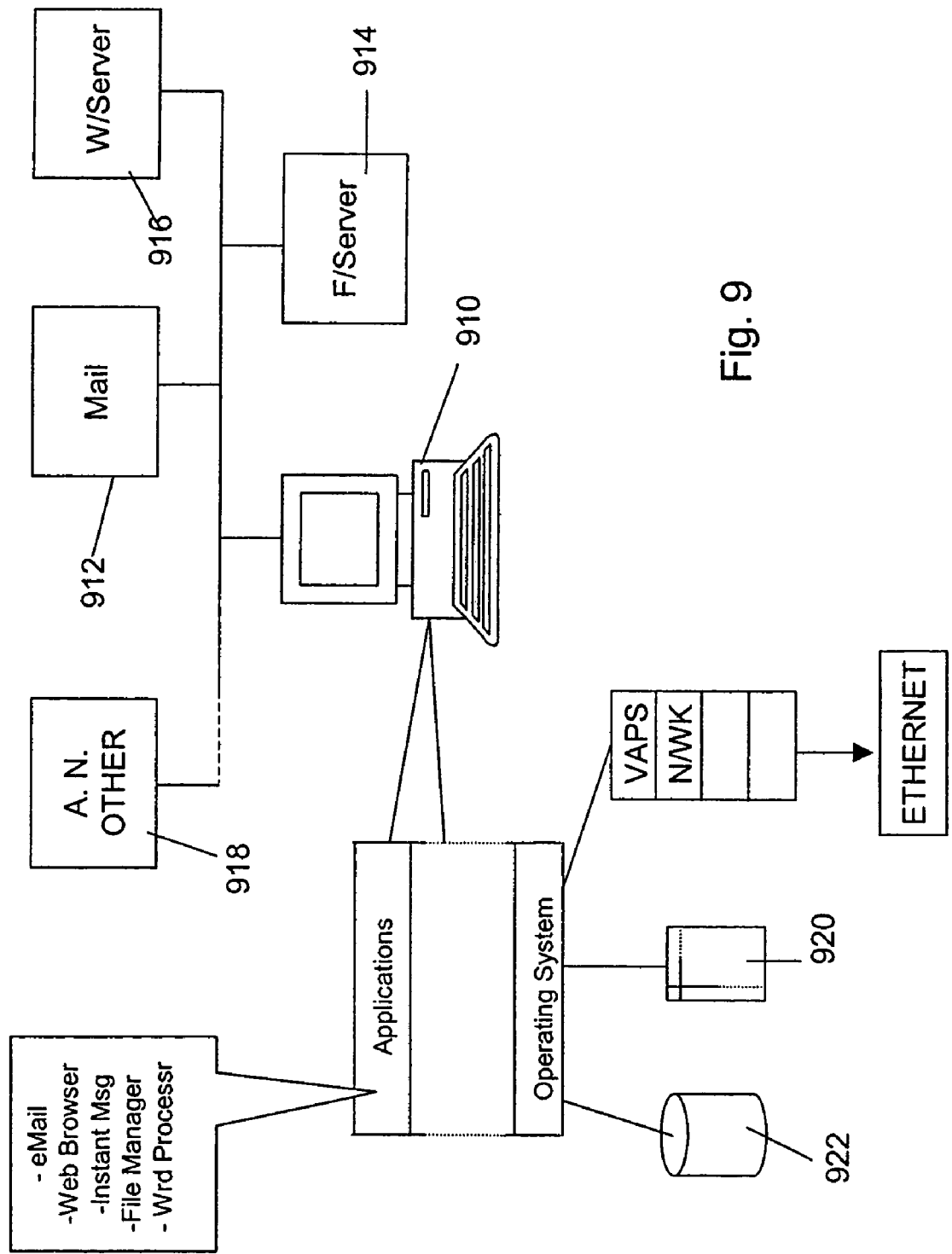
FIG. 9 is a schematic description illustration of an information technology network.
Figure 10:
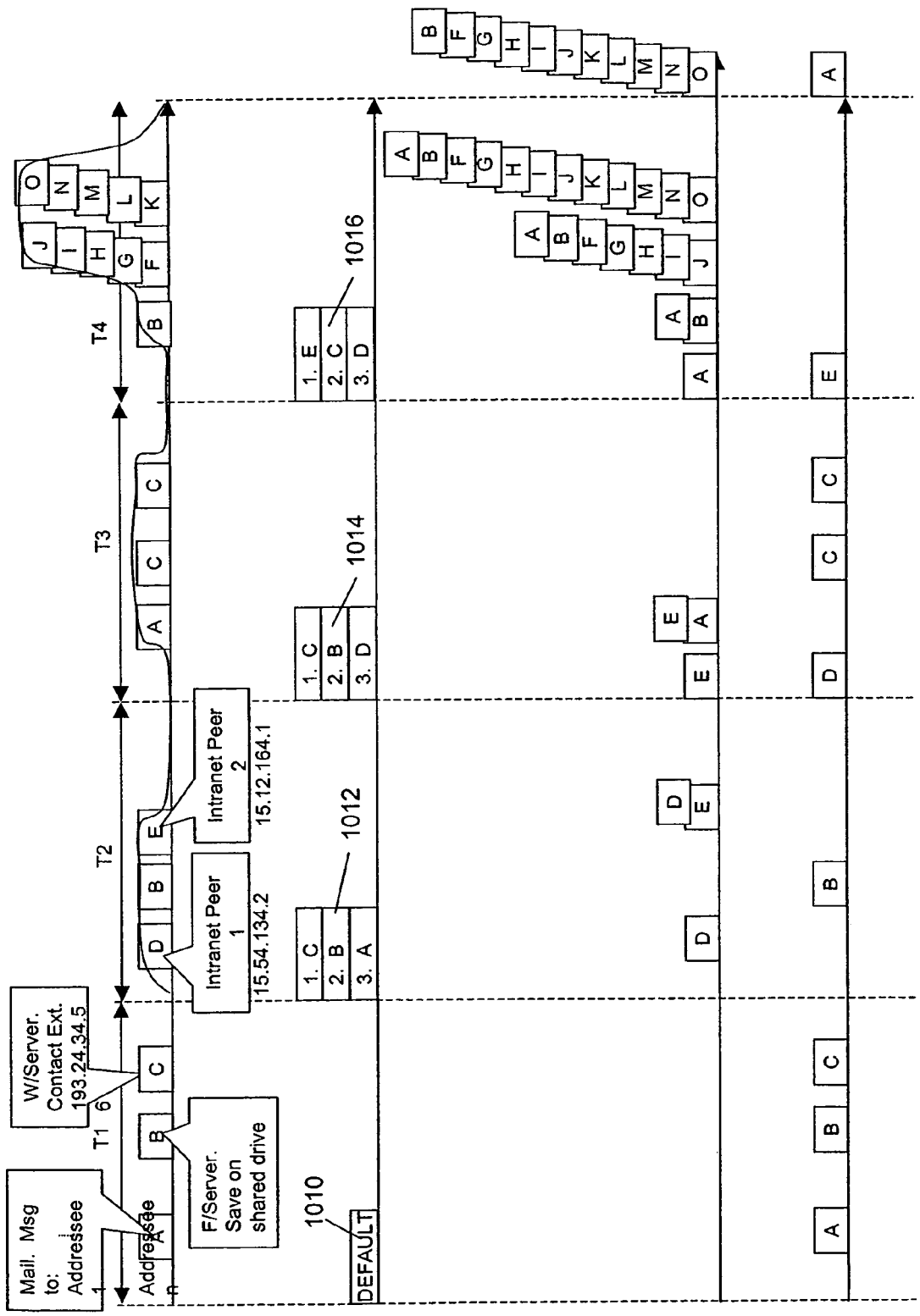
FIGS. 10A-D are schematic illustrations of network traffic from a first host of the network illustrated in FIG. 9, and the management of such network traffic.

Referring now to FIG. 9, a network, which as previously includes a plurality of interconnected hosts: a workstation 910 which is typically a personal computer for example, a mail server 912 ("Mail") which handles email communication within the network, a file server 914 ("F/Server") on which shared data within the network is stored, and a web proxy server 916 via which any communication between any host within the intranet and an external host passes. In addition the network includes further hosts not illustrated explicitly in FIG. 9, one of which 918 is illustrated under the denomination A. N. OTHER, and whose function within the network has no bearing upon the illustration of the present embodiment.

The workstation 910 runs a plurality of Application software programs concurrently; and as described in connection with FIG. 5, an operating system software and usual hardware of the workstation, such as memory 920, storage 922, with an Ethernet card. Examples of the sort of applications programs which run on the workstation 910 include programs to handle the receipt and dispatch of email from the mail server 912, a web browsing program, a file manager program enabling the organisation and transportation of files, and instant messaging software enabling the dispatch and receipt of ASCII text messages directly to and from peers within the network. In addition, and in accordance with the illustrated embodiment, a further software program, Virus Anti-Propagation Software (VAPS), runs within the network stack, in the same position as the VPMS in FIG. 5 adjacent the networking software.

As with the VPMS the VAPS handles all requests to send outbound data from the workstation 910, and operates to restrict the propagation of viruses within the network by limiting the extent to which the workstation can engage in what may be thought of as "unusual" behaviour in contacting other hosts. As mentioned previously in connection with the VPMS, it has been established that in many networks, normal network traffic (i.e. non-virally related) is characterised by a relatively low rate of connection to hosts within the network which have previously not been contacted. In contrast, virally-related traffic is frequently characterised by a relatively high rate of connection, or attempted connection to previously uncontacted hosts. Broadly speaking, the function of the VAPS is to impede virally-related traffic, while allowing non-virally related traffic to flow with little or no impediment. In the present example the VAPS operates upon the basis of a series of time intervals or time windows, which in the present illustrated example are of predetermined and constant length $T_n$. In any given time window $T_n$ the VAPS operates to prevent the host upon which it is running from transmitting requests to more than a predetermined number of "new" hosts, i.e. hosts whose identities differ from those specified in a dispatch record of containing identities of destination hosts to whom requests have recently been transmitted. The dispatch record only holds a predetermined number N of destination host identities, so that a destination host specified in a request is classified as new if it is not one of the N destination hosts to which a request has been transmitted. The number of new hosts allowed per time window, and the value of N are determined on the basis of a policy, typically defined by a system administrator, and the policy is preferably formulated to take account of the nature of non virally-related network traffic. In this way, the VAPS operates to limit the speed at which a virus resident on the host may propagate from that host to other hosts within the network.

Referring to FIG. 10A, over the course of the time window T1, various applications programs running on the workstation send requests to the VAPS to connect and send data to destination hosts within the network: the email application program, which requests dispatch of an email message (having multiple addressees) to the mail server 912, Mail (Request A), the file management application program requesting dispatch of a file to the file server 914, F/Server in order to save a text document on a shared network drive (Request B), and the web browser program which requests contact with the Web Proxy server 916, W/Server in order to contact a site external to the subnet within which the workstation 910 is located (Request C). as described above, requests to the VAPS from each of these hosts may be in form of requests to establish a connection to an identified destination host, or requests for use of connection all protocols and as previously, the term "request" is intended to be interpreted in the broad since indicated above to encompass any indication that contact with an identified destination host is required,. A request for connection, if allowed, is followed by data typically in the form of data packets from the relevant application program transmitted to the identified destination host.

These requests are processed in accordance with in incoming request routine, forming part of the VAPS (illustrated in FIG. 11), and the various steps that take place during the course of this routine will now be described in more detail with reference to the graphical representations of FIGS. 10A-D in combination with the flowchart of FIG. 11. Subsequent to their generation by their respective applications programs, each of the outbound requests, hereinafter abbreviated as Requests A, B, C passes from the respective application by which they were generated, to the VAPS in the network stack, whereupon the process within the VAPS which processes the requests is initiated in step 1102. Upon passing into the VAPS, the identity of the requested destination host specified in each packet is matched with a dispatch record in which the identities of a predetermined number N (which in this example is 3) of destination hosts most recently contacted in the previous time window are stored (and which are shown for each time window in FIG. 10B), in order to determine whether the requested destination host is a new host, as represented at step 1104. In the present example as previously, somewhat artificially, but nonetheless serving to illustrate the principles underlying embodiments of the present invention, the time interval T1 is the first time interval after start-up of the workstation 910. The VAPS therefore matches the destination host identities for each of the Requests A-C against identities held in a "default" dispatch record 1010 for the time period T1, which may be (and in the illustrated example, is) simply a record of the three hosts most frequently contacted during the lifetime of the workstation. In the present example the three most frequently contacted hosts, and therefore the three identities retained in the default dispatch record are those of the mail server 912 (Request A), the file server 914 (Request B) and the web proxy server 916 (Request C). Since each of the three outbound requests from the workstation during the time period T1 identify a host destination matching one of the three host identities in the default dispatch record, and therefore none of the Requests is seeking to establish contact with a new destination host, the VAPS transmits each request at step 1106, and in the present example this means that it allows a connection with each of these hosts to be established. Transmission of the request is illustrated schematically on the graph of FIG. 10D, which has the same time scale as FIGS. 10A-C, meaning that the temporal relationship between events illustrated in each of these graphs can be readily appreciated.

During the course of the second time interval T2, three further outbound requests identifying host destinations "Intranet Peer 1" (Request D), Request B (which as indicated above corresponds to the File Server 914) and "Intranet Peer 2" (Request E) are received by the VAPS from: an instant messaging application program (in the case of Requests D and E), and the word processing application in the case of Request B. As in the previous time window, as each request passes to the VAPS, and as previously indicated in step 1104, the identity of the host destination in the request is matched with the identities present in the dispatch record 1012. The dispatch record however is now a genuine record of the identities of the three hosts to whom request have been transmitted most recently in accordance with the policy during the previous time window T1 (although coincidentally this is identical to the default dispatch record). Upon receipt of Request D, the VAPS establishes at step 1014 that the identity of this host is not in the dispatch record, i.e. that it is a new destination host, whereupon the request is denied, and is instead stored in a delay buffer step 1108. The delay buffer is effectively a queue of requests which have not been transmitted, and the contents of the delay buffer are illustrated schematically in FIG. 10C (the delay buffer is shown in FIG. 10C on each occasion that its contents change). It therefore follows that for each request illustrated in FIG. 10A, there is either a corresponding change in the delay buffer (illustrated in FIG. 10C) when the request is denied or transmission of the request (illustrated in FIG. 10D) when the request is transmitted (possibly accompanied by a change in the despatch record). Request B is processed as previously indicated, and given that B is present in the dispatch record, this request is transmitted, which can be seen in FIG. 10D, while Request E, in a similar manner to that of the instance of Request D, is denied and added to the delay buffer, as illustrated in FIG. 10C.

Thus, at the end of the time period T2, no requests to new destination hosts have been transmitted, and the delay buffer contains two entries. At this juncture (i.e. at end of time period T2), the policy which the VAPS is designed to perform comes into play. In the present example, the policy provides that a single new host may be contacted per time interval. This element of the policy is performed by a first buffer management routine, which is illustrated schematically in flowchart form in FIG. 12A, and begins at step 1202 with the advent of a clock timeout, that is to say that the clock (not shown) which defines the time intervals $T_n$ has completed another time period. At step 1203 the routine determines whether there are any entries in the delay buffer (identifying new requests), and it does this using a variable known as LogNo, which is the number of entries in the delay buffer at any moment; if LogNo is not greater than 1 (step 1204), i.e. there are no entries in the delay buffer the routine ends at step 1206. In the present illustrated example however it can be seen that over the course of the time interval T2 two requests, D and E have occurred, causing two corresponding entries to accumulate in the buffer, and so the routine proceeds to step 1208, at which the first request RQ1 (i.e. the one which has been in the buffer for the longest time) is transmitted. Optionally, at step 1210, the routine then searches the buffer for other entries identifying requests specifying the same destination host and transmits any such requests, the logic behind this being that, in the event there is a virus in the first transmitted request RQ1, further copies of the virus are not likely to be deleterious to any greater extent. Alternatively, step 1210 can be omitted. This is followed at step 1212 by updating the dispatch record so that it accurately reflects the identity of the three most recently contacted hosts, and in FIG. 10B it can be seen that the dispatch record contains the identities D, C, B, which are the three most recently transmitted requests, as indicated in FIG. 10D in accordance with policy. The final step in the first buffer management routine is the updating of the value of the variable LogNo denoting the size of the buffer, which in this example, following the transmission of the request D, is one (i.e. the single request E). Thus, at the end of the time interval the buffer provides a record of requests occurring outside of the bounds of the policy.

The buffer size plays an important role in performance by the VAPS of another aspect of the policy, in that it is possible, if desired, to define a state of viral infection in terms of the size of the buffer, and the stage of any such viral infection by the rate of change of the buffer size. This follows from the generally different behaviour if virally-related and non virally-related network traffic, in that non virally-related or "legitimate" network traffic usually involves contacting only a relatively small number of new destination hosts, whereas, because viruses tend to propagate by transmission to as many disparate destination hosts as possible, an instance of a large number of requests to contact a new destination host will typically be indicative of viral infection. Given that the buffer is effectively a queue of new requests waiting to be transmitted, the size of the buffer is one indication of whether there is viral infection, since a large buffer size is indicative of a large number of requests to contact a new host within a short space of time. In addition, if the buffer size is increasing, this is correspondingly indicative of the onset of viral infection, whereas a steadily declining buffer size, although large, will be indicative of the end of a viral infection.

A second buffer management routine, illustrated in FIG. 12B carries out this part of the policy, and is triggered at step 1240 by the occurrence of an update of the value of LogNo (this being step 1214 in the first buffer management routine). This routine can also be triggered by step 1203, or step 1108 in FIG. 11. Following which, at decision step 1242, the routine determines whether the size of the buffer is greater than a quantity $V_i$, which the policy has determined represents viral infection, whereupon at step 1244 it generates a virus alert. This may simply be a visual alert to a user of the workstation 810, or a message to the network administrator, or both, or even a trigger for automated action to shut the network down, as desired. At step 1246, the routine determines whether the variable $V_i$ is increasing above a given rate, and if it is, issues a further warning indicating the onset of viral infection at step 1248, following which the routine ends.

A situation in which the second buffer management routine generates a viral infection warning can be seen in FIGS. 10A-D. During time interval T3, a single Request A (which it will be recalled from the time interval T1 is to contact the mail server), and two Requests C are received. Because the dispatch record 1014 for this time interval does not contain Request A, this request is denied and sent to the delay buffer, while the two Requests C are transmitted. At the end of the time interval T3 the buffer therefore contains Request E (stored in the delay buffer since time interval T2) and Request A, and in accordance with the policy, the first buffer management routine transmits Request E at the end of the time interval T3, meaning that at the start of time interval T4 the buffer contains only Request A. The first Request for connection in time interval T4 is Request B (the File Server), which illustrates that over the course of three time intervals, during which only normal network traffic has been transmitted, connection has only been requested to five different destination hosts. However, Request B is nonetheless defined as new because it's not in the dispatch record 1016 for time interval T4, and so is sent to the buffer (this action being illustrated at the same point in the timeline in FIG. 10C). After receipt of request B, two groups of five virtually simultaneous requests are received: F-J, and K-O, and since these are also new, they are also added to the buffer upon receipt and processing. Referring specifically to FIG. 10C during time interval T4, it can readily be seen that the buffer has increased from a size of one, to 12, and in accordance with the policy, this is defined as viral infection, since in the present example a buffer size of greater than five generates this alert. Moreover, size the rate of change is positive and rapid (from 1 to 12 in a single time interval), this is indicative of the onset of infection.

In the example described above the VAPS has been configured to delay outbound requests, and as seen this has the advantage of being able to use the delay buffer to provide useful information. In addition, delaying outbound requests for connection is generally regarded as being compatible with the operation of many computer systems and networks. However, the VAPS may be configured to operate in a number of ways. For example, in accordance with an alternative embodiment, where the computer system permits, the VAPS may, having denied the request for connection, and simply return a suitable error message to the dispatching application program by which the packet was generated, and then delete the packet. In accordance with this embodiment the dispatching application program must, if the packet is eventually to be successfully dispatched then resend the packet the VAPS. In this alternative embodiment, the policy relating to the number of new requests which are to be transmitted per interval may be performed by initialising a variable corresponding to the number of new requests received in a particular time interval, and augmenting this variable whenever a new request is received. Requests may then either be instantaneously transmitted (in the same manner as requests already in the dispatch record) or denied and deleted on the basis of whether the variable indicative of the number of new requests per time interval has reached a maximum set in accordance with the policy (i.e. in the previous example, one).

In the present example, the dispatch record lists transmitted requests in historical order, with the ordinal numbering signifying the temporal order in which the hosts where contacted, i.e. No. 1 indicating the host most recently contacted, and No. 3 indicating the host contacted the longest time previously (or "first in first out)". This is not essential, and it is equally possible to list the transmitted requests in another order, such as "first in last out" for example, or "least recently used".

In a similar way to that described in connection with the first embodiment, a single outbound request (Request A) to the VAPS, specifying a single destination host, namely the mail server, actually contains a plurality of email messages to different specified addressees. As previously, in such a situation therefore, if the VAPS operates simply to restrict the number of new destination hosts to be contacted per time window on the basis only of those destination hosts which are ostensibly identified in the outbound request, the desired restrictive effect on virus propagation may be circumvented or reduced, because a single outbound request specifying the mail server does not necessarily represent only a single email subsequently propagating through the network after processing and forwarding by the mail server.

As with the first embodiment, in a modification of the second embodiment thus far described, the VAPS includes within its routine a step of identifying the application program by which an outbound request has been generated. Because certain applications programs are more likely than others to use outbound carrier requests which invoke the use of a proxy (for example the above-mentioned instance of email, or the case of a web browser program) it is possible in advance to specify criteria, based on the provenance of an outbound request, identifying those outbound requests likely to be carrier requests. If the packet is generated by one such specified application program, then the VAPS invokes the use of the application program concerned to reveal the identities of the destination hosts specified in the sub-requests; here the eventual addressees for whom the email message is intended. Once the identities of the genuine or ultimate addressees have been obtained, there are several options for processing the request. In accordance with one alternative the identities of the destination hosts specified in the sub-request can be regulated in accordance with the same policy which applies to all other requests for connections, and they can be matched against the host identities within the dispatch record in the manner previously described in the embodiment of FIG. 11. In the event that the message contains more new addressees than the policy which the VAPS is performing will allow to be transmitted in a single time window, then what may be thought of as the surplus addressees may, depending upon the operation of the email program, either be purged from the list, and the message transmitted (such surplus messages may alternatively be dealt with in a different manner, which may also be specified in accordance with the policy), or preferably they are stored in a delay buffer as illustrated in connection with FIGS. 10 and 11.

Since in the case for example of email, the use of outbound carrier requests to a host acting as a proxy for the ultimate addressees of the email messages is the norm, it is, in a modification, possible for different versions of VAPS to run simultaneously, effectively operating in parallel with each other: one which applies to hosts specified in the outbound request (including carrier requests), and another which applies to hosts specified in any sub-requests identified by the email application program. In such a situation, each VAPS will operate independently, using its own dispatch record, and performing a policy for outbound requests tailored to the traffic it is set up to control, for example in the manner previously described and illustrated in connection with FIGS. 10 and 11. The two policies may be the same (e.g. a dispatch record of 3 identities, a time window of constant duration $T_n$, and one new host per outbound request/sub-request), or different as desired.

The choice of the length of the time window, the number of identities retained in a dispatch record, and the number of new hosts to be allowed per time window are all dependent upon the likely "normal" performance of the network within which the VAPS is operating, and more particularly, the nature of the network traffic the VAPS is intended to control. Therefore, while a policy such as that illustrated in connection with FIGS. 10 and 11 may be effective in limiting the propagation of viruses through the network to a rate of infection of one new host per time interval, it may also be susceptible to interfering with non virally-related, or "legitimate" network traffic whose characteristic behaviour differs substantially from the policy the VAPS is performing. To ameliorate this difficulty, it is possible to provide a version of VAPS for each application program from which network traffic emanates, with each VAPS implementing a policy tailored specifically to minimise the level of impediment to legitimate network traffic.

Referring now to FIG. 13A, a plot of activity (i.e. the number of requests processed by the VAPS) against time is illustrated for example of FIG. 10A. From this graph it can be readily appreciated that prior to the viral infection signified by the rapid increase in the number of requests during the time interval T4, only a relatively low number of requests are processed per time interval, and that therefore it is possible to use the VAPS to carry out a policy preventing connection to more than one new host per time interval without impeding legitimate network traffic to any significant extent. Consider however an excerpt of a graph illustrating legitimate traffic flow in FIG. 13B, where there are significant levels of activity, interspersed by a much shorter period of time during which there is no activity at all. Applying the rather simple policy of permitting connection to one new host per time interval, where all time intervals are of the same duration would significantly impede the flow of the legitimate network traffic illustrated in FIG. 13B. Ideally therefore, an alternative policy is required which accounts for the nature of this legitimate traffic flow. An example of such a policy is illustrated referring now to FIG. 13C, where two sorts of time intervals are illustrated: $S_l$, a relatively long time interval, and $S_s$, a relatively short time interval. From FIG. 13C it can be seen that when placed together alternately, the time intervals $S_l$ corresponds to the time interval in the graph of the traffic flow from FIG. 13B where there is a flow of traffic, and the time interval $S_s$ to the time interval between two such time intervals, where there is no traffic flow. By segmenting time for a VAPS using these two time intervals therefore, it is possible to construct a policy which matches closely the legitimate behaviour illustrated in FIG. 13B, but still provides an impediment to the propagation of viruses. Such a policy for the VAPS may be implemented using the variable LogNo, which as explained above corresponds to the number of requests present in the delay buffer at the end of any given time interval. In the present example it is desirable to implement a policy which does not impede the free flow of the legitimate traffic pattern illustrated in FIG. 13C, and referring now to FIG. 14, to this end a modified first buffer management routine is provided. Following a clock timeout at step 1402, the routine determines at step 1404 whether the LogNo is greater than a predetermined number, in this instance 10, this number being chosen, in conjunction with the number of request identities held in the dispatch record, to be equal or slightly larger than the number of requests typically received during a "long" time interval $S_l$. If LogNo is greater than this number, then the routine defaults to step 1408, where it transmits only the first request in the delay buffer, and then proceeds to steps 1412 to 1416 where identical requests are transmitted (step 1412) the record is updated (step 1414), and the value of LogNo is updated (step 1416). If LogNo is less than 10, i.e. less than 10 new requests have been received during the course of that time interval, then the routine proceeds to step 1406, at which it determines whether a further variable LogNoLast, equal to the number of new requests received during the previous time interval, is greater than zero. If it is, then the routine defaults once again to step 1408 where only a single request is transmitted from the delay buffer. If it is not, i.e. no new requests were received during the previous time interval, then the routine acts to transmit, at step 1410, requests 1-10 from the delay buffer, followed by the steps 1412 to 1416. Thus, when 10 or less new requests are received during a time interval, and no new requests were received during the previous time window, the routine operates to transmit all 10 requests.

This mimics the legitimate activity during a "long" time interval $S_l$, where the activity level is relatively high, but in the previous short time interval activity was zero. Correspondingly, in any time window where there were more than 10 new requests (i.e. a greater level of activity than usual in a longer time interval) or where, in the previous time window there were more than zero new requests (which is the pattern of legitimate traffic flow illustrated in FIG. 13B), the routine defaults to what may be thought of as the "standard" policy of one new request per time interval, thus throttling activity differing from usual legitimate activity, and which is likely to be virally-related. The modified routine thus carries out a policy which conforms generally to the behaviour pattern illustrated in FIG. 13C.

This modified policy implementation has been achieved using two time intervals of different lengths, and a modified version of the buffer management routine, effectively to augment the number of destination hosts which, ultimately (i.e. in this example, at the end of time intervals $S_l$) end up not being regarded as new. It is however possible to carry out policies by varying other parameters, such as the number of destination host identities retained in the dispatch record, thereby increasing for any given time interval, the number of destination hosts which will not be regarded as being new, and consequently transmitting a greater number of destination hosts per time interval (or in the case of FIGS. 13C and 14, per alternate time interval). This would be appropriate in circumstances where the legitimate traffic flow of FIG. 13B was characterised by contact with 10 destination hosts whose identities are the same, or similar each time. To achieve this for the traffic flow of FIG. 13B, two dispatch records for the destination hosts are used: one for the time intervals $S_l$, containing 10 destination host identities, and the other for the time intervals $S_s$, containing no destination host identities, with the two dispatch records being used alternately. However, as indicated above, where the legitimate traffic flow is characterised by contact with (in this example) 10 different destination hosts each time interval $S_l$, this modification would not be appropriate because it would still impede this legitimate traffic flow.

Figure 11:
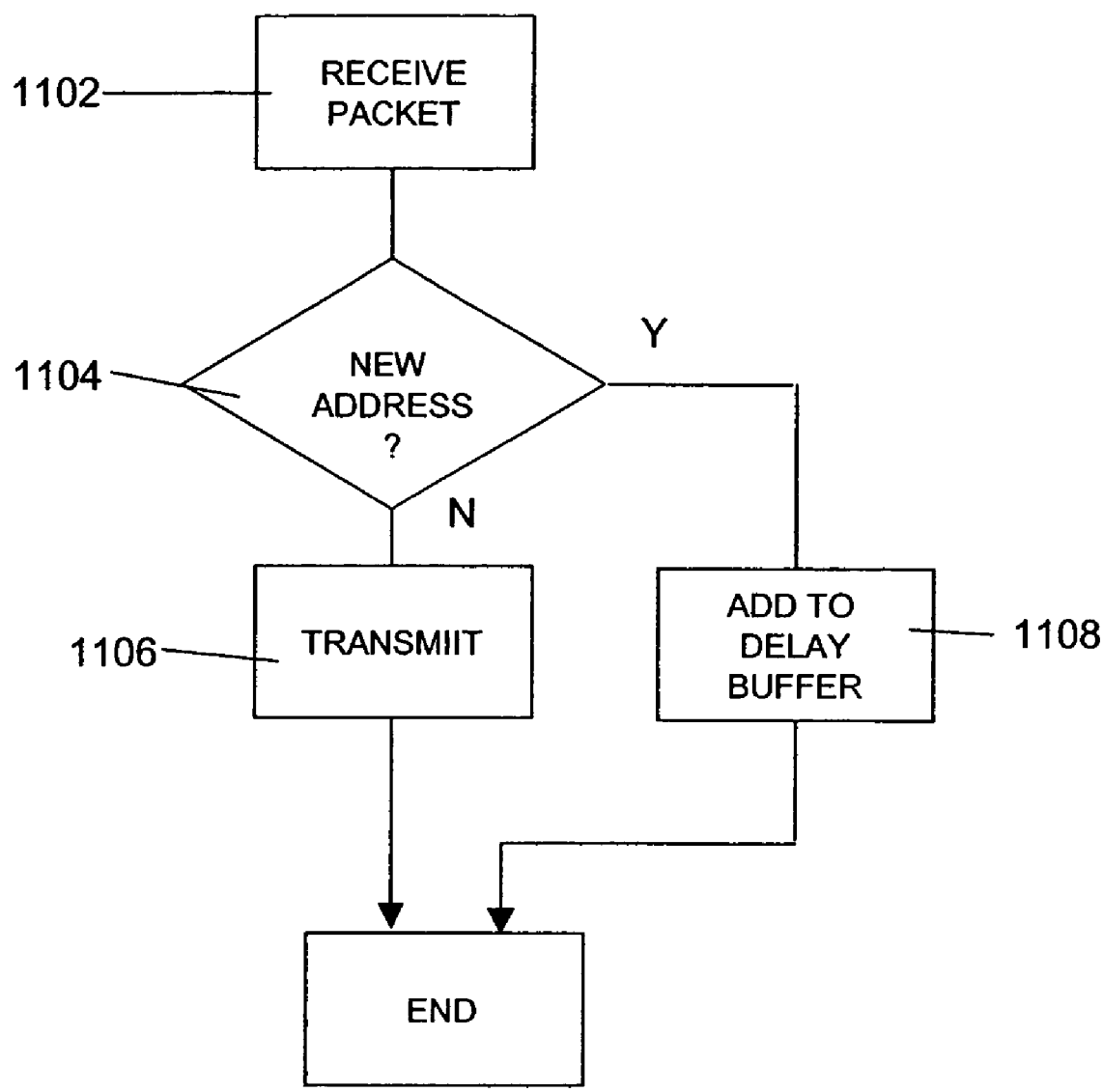
FIG. 11 is a flow chart illustrating operation of an aspect of a method according to one embodiment.
Figure 14:
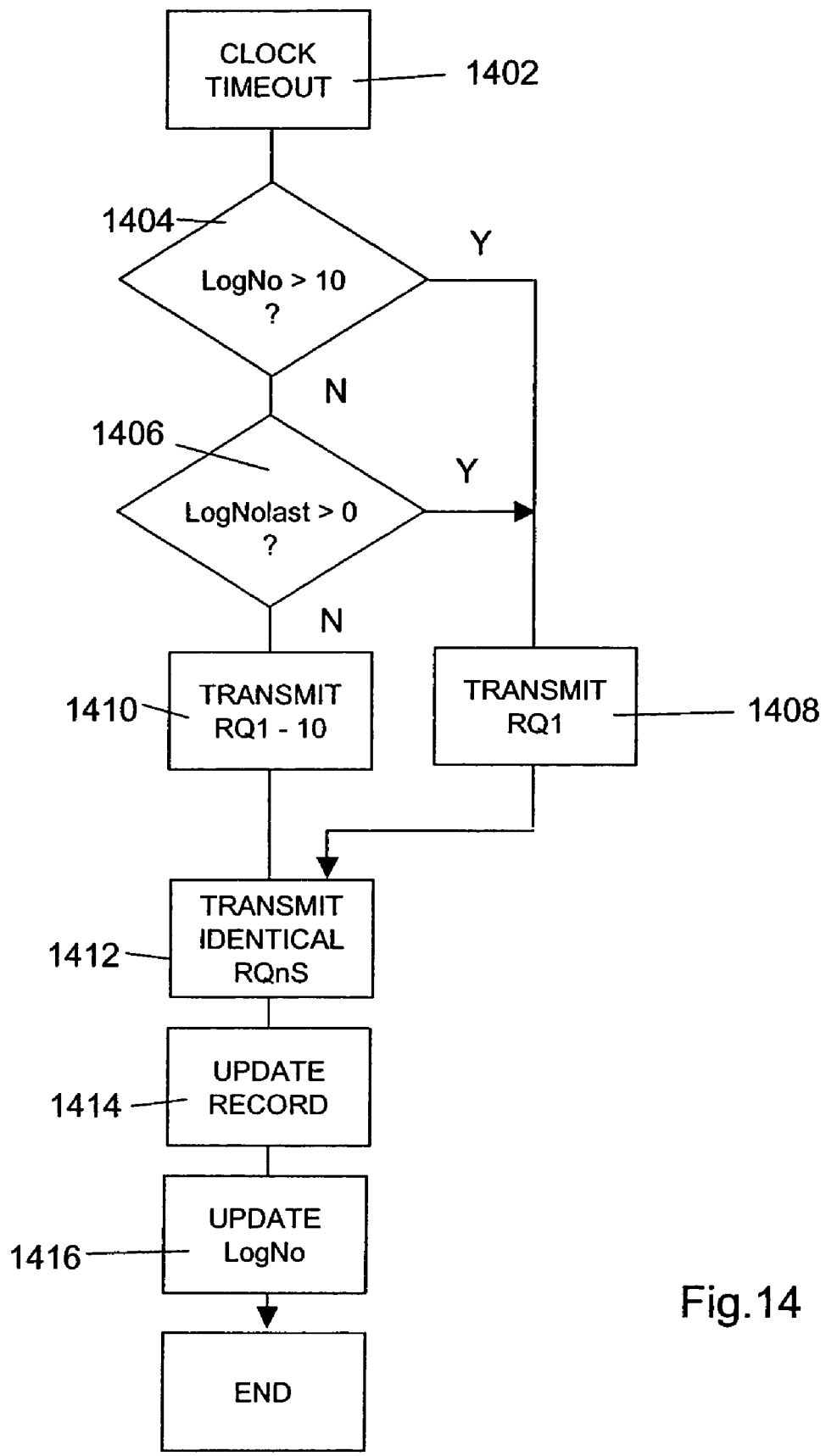
FIG. 14 is a flowchart of steps for performing the embodiment of method illustrated in FIG. 13C.

In yet a further and more refined version of this policy implementation, in which provision is made for contact with 10 new destination hosts per time interval $S_l$, a modified version of the routine of FIG. 11, in which the further variables NreqNo, and NreqNolast, denoting the number of new requests in a particular time interval, and the number of new requests the preceding time interval (and thus the real time equivalents to LogNo and LogNolast) are used to transmit new requests contemporaneously, up to a maximum of 10 per time interval, provided that the two criteria of steps 1404 and 1406 are satisfied, i.e. that ReqNo is less than 10, AND ReqNolast was equal to zero. This modification has the advantage of allowing requests to pass immediately, which in cases where legitimate traffic levels are high, prevents undue impediment to traffic flow. In this modified version new requests which are not transmitted are once again stored in the delay buffer, which as previously, inter alia enables an indication of viral infection from the value of the LogNo variable.

The operation of the VAPS has been illustrated herein on a single workstation within a network. However, in order to be most advantageous it is desirably performed on a plurality of hosts within the network; the greater the number of hosts upon which it is performed resulting in a greater limit on the ability of viruses to propagate through the network.

The use of a number of different VAPS running concurrently, with one VAPS per application program is preferred, since it enables the implementation of different policies for different application programs and thus policies designed to minimise impediment to legitimate traffic flow, while simultaneously providing protection against viral propagation via the appropriated use of application programs. Other implementations are possible, such as: a single VAPS carrying out a single policy for all applications programs; a plurality of VAPS, some of which deal with traffic from a specified application program, and some of which deal with traffic to a particular destination port (which may be thought of generally as dealing with traffic using a particular communications protocol); or a plurality of VAPS may be provided with each one dealing with traffic for a particular destination port.

The second of the above techniques effectively restricts, or applies a "throttle" to any virus, by limiting the rate of connections (or interactions) with new hosts. Preferably, transmission of requests that occur at a higher rate than normal are delayed by adding them to a delay buffer from which they are removed at a constant rate. When the size of the delay buffer reaches a predetermined limit, the offending source program (in the case where different VAPS run for different programmes) is assumed to be virally infected, and of further requests in prevented.

The present inventors have realised that any traffic that is legitimate (i.e. not a virus) that gets caught up with the viral traffic will be delayed if it does not identify a destination host which is not in the dispatch record set. Such non-viral traffic will simply be placed in the delay buffer, along with the viral traffic, and thus will be impeded along with the viral traffic.

The present inventors have realised that this can be addressed by providing an additional selection process to determine to which destination hosts of the network the source requests may be transmitted.

This additional selection process can take a number of forms.

In the above embodiments, the dispatch record is established and identifies destination hosts within the network to whom requests may be transmitted (i.e. to whom data may be sent or, in the case of the protocol using connection sockets created) by monitoring identities of destination hosts. Such a record is dynamically updated.

According to a further embodiment of the present invention, an additional, second record is established. The second record is a fixed list identifying hosts within the network. The fixed list contains identities (or other data which arrives o idenfity e.g. the addresses) of hosts destination with whom communication is important. Consequently, when checking to see whether a request is regarded as new, the check is made against both the normal dispatch record of hosts, and against the fixed record indicating vital destination hosts.

For instance, such "VIP" destination hosts can include a mail server, a web proxy server, or a database. Such a fixed record could be configured by the user of the host, or alternatively could be configured remotely by a system administrator. Alternatively, the fixed record could automatically be set up by examining the system configuration of the host machine, and identifying the desired contents of the fixed record according to predetermined criteria e.g. which destination host on the network is utilised as a web proxy server, which is utilised as a mail server etc.

A number of alternative additional selection processes can be carried out by determining a characteristic of a new request indicative of at least one of its origin or protocol. For example, the origin may be the particular application or process responsible for the request. The protocol may be determined from the destination port of the request, or the data stream associated with the request.

In the this embodiment, the fixed list can comprise one or more characteristics of a request associated with each host identity or indicative of host identity, to further restrict the requests allowed by the fixed list.

A request characteristic is determined for each request within the delay buffer.

In one example of the additional selection process, the requests within the delay buffer are prioritised based upon the determined request characteristic. In particular, requests having the characteristic used least out all of the characteristics for requests in the buffer are determined. These requests are treated as having the highest priority i.e. they are removed from the delay buffer before the other requests. For instance, in one example, the request characteristic determined for each request in the buffer is the application from which the request originated. If viral traffic is the most common traffic in the delay buffer, then the traffic that is from legitimate behaviour is likely to form a relatively small proportion of the overall traffic. If the delay buffer is sorted by application (e.g. the number of requests originating from each application), then priority can be given to requests that come from applications with small numbers of requests in the buffer. These are most likely to be normal (i.e. non-viral) requests.

In an alternative embodiment (which may be used in conjunction with either of the above embodiments, or as an alternative to the above embodiments), the request characteristic is again determined for each request in the buffer i.e. the origin and/or the protocol of each request determined. If greater than a predetermined threshold number of requests share the same characteristic (i.e. origin and/or protocol) then all traffic is blocked that share that characteristic. By blocking that traffic, it is meant that either all of those requests sharing the common characteristic are removed from the buffer (and any thresholds recalculated), or alternatively the requests are left in the delay buffer to accumulate, and one simply not transmitted from the delay buffer.

The predetermined threshold can be an absolute number of requests, or can be a percentage of the total number of requests in the buffer, or a combination thereof. For instance, in one preferred embodiment, the threshold is set at 50% of the total number of requests in the delay buffer, if the number of requests in the buffer exceeds a minimum threshold of a total of 100 requests in the buffer.

In an alternative embodiment, instead of checking whether the number of requests shared by any one request characteristic rises above the predetermined threshold, each request characteristic has a separate, predetermined threshold against which the number of requests is compared. For instance, if the request characteristic determined is the originating application of each request, then a first application may have a threshold of 30% of the delay buffer if the number of requests in the buffer exceeds 50, whilst a second originating application may have an absolute threshold of ten requests within the delay buffer. Again, if the number of requests sharing that request characteristic exceeds the respective threshold, then those requests can be blocked.

It will be appreciated, that by providing such an additional selection process for determining which hosts of the network can be contacted, the present invention improves the performance of the VAPS. In particular, such an additional selection process is advantageous in the period between the onset of a virus spreading and the stop of all traffic by the VAPS. It is particularly advantageous if this period is long e.g. if the threshold stopping the virus is set relatively high, and the virus spreading rate is relatively slow, or alternatively if the decision is made to allow the virus to spread slowly rather than stopping the offending originating application.

When the offending application is stopped, the delay buffer can be flushed of all requests from that source, allowing normal activity to continue as normal. This can occur whether the application program itself is suspended, or whether all requests from that application program are blocked.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention claimed is:

1. A method of restricting propagation of viruses in a network having a plurality of hosts, said method comprising:
   establishing, for a first host of the plurality, a set of records comprising at least a first record which is at least indicative of identities of hosts within the network contacted by a first host, the first record being established by monitoring network activity of the first host;
   limiting contact of the first host to other hosts within the network over the course of a first time interval, by allowing the first host to contact any hosts in the first record while preventing the first host from contacting more than a predetermined number of hosts not in the set of records;
   wherein the method further comprises an additional selection process for determining which hosts of the plurality the first host is allowed to contact.

2. A method as claimed in claim 1, wherein the first record is indicative of identities of hosts within the network either: to whom data has been sent by the first host; or with whom a socket has been established.

3. A method as claimed in claim 1, wherein the set of records further comprises a second record which identifies destination hosts with whom contact is a priority; and
   wherein the additional selection process allows the first host to contact, during the first time interval, any host in the second record.

4. A method as claimed in claim 3, wherein the second record is established by examining the system configuration of the first host.

5. A method as claimed in claim 1, wherein the set of records further comprises a second record which identifies destination hosts with whom contact is a priority and which is indicative of connection characteristics of priority requests to said destination hosts; and
   wherein the additional selection process allows, during the first time interval, the first host to permit any request to contact a host in the second record where the request matches the priority request characteristics in the second record.

6. A method as claimed in claim 3, wherein the second record is established by a user.

7. A method as claimed in claim 1, further comprising:
   diverting requests to contact hosts not in the set of records to a delay buffer; and
   transmitting the predetermined number of requests from the delay buffer at the end of the first time interval.

8. A method as claimed in claim 7, further comprising determining a request characteristic indicative of at least one of the origin or the protocol of each request within the delay buffer.

9. A method as claimed in claim 8, wherein the additional selection process comprises selecting the predetermined number of requests for transmission from the delay buffer by:
   calculating a number of requests sharing each determined request characteristic;
   determining the request characteristic shared by the lowest number of requests as the least common request characteristic; and
   selecting for transmission from the delay buffer those requests which have in common the least common request characteristic.

10. A method as claimed in claim 9, wherein the additional selection process further comprises:
    determining the next least common request characteristic; and
    selecting the requests sharing the next least common characteristic.

11. A method as claimed in claim 8, wherein the additional selection process further comprises:
    calculating a number of requests sharing each request characteristic; and
    blocking all requests sharing a characteristic where the number of such requests is above a predetermined threshold.

12. A method as claimed in claim 11, wherein the threshold corresponds to 50% of the total number of requests in the buffer at least where the total number of requests exceeds a predetermined minimum threshold.

13. A method as claimed in claim 11, wherein a separate said predetermined threshold is applied for each respective request characteristic.

14. A method as claimed in claim 8, further comprising:
    calculating the number of requests sharing each request characteristic; and
    removing from the delay buffer all requests sharing a single characteristic where the number of such requests is above a predetermined threshold.

15. A computing entity in a network comprising a processor, the computing entity being programmed
    to establish a set of records comprising at least a first record indicating identities of other entities in the network to whom a communication has been sent,
    for the duration of a predetermined interval of time, to allow dispatch of communications to any network entity in the first record while restricting dispatch of communications to other network entities whose identity is not in the set of records to a predetermined number of such entities, and
    to perform an additional selection process to determine to which network entities whose identity is not in the first record said computing entity is allowed to dispatch a communication.

16. A computing entity according to claim 15, wherein the computing entity is programmed to store requests to dispatch communications to network entities whose identity is not in the record in a buffer.

17. A computing entity according to claim 16, wherein the computing entity is programmed to perform the additional selection process on requests stored in the buffer.

18. A computing entity according to claim 17, wherein requests are stored in the buffer in temporal order, and the additional selection process operates to re-order requests stored in the buffer.

19. A computing entity according to claim 18, wherein a predetermined number of requests to dispatch communication to entities whose identity is not in the first record are dispatched from the buffer with the passing of each predetermined interval of time.

20. A network having a plurality of computing entities according to claim 15.

21. A computing entity according to claim 15, wherein
the set of records further comprises a second record which identifies network entities with whom contact is a priority; and
the additional selection process allows the computing entity to dispatch communications, during the predetermined time interval, to any network entity in the second record.

22. A computing entity according to claim 15, wherein
the set of records further comprises a second record which identifies network entities with whom contact is a priority and which is indicative of connection characteristics of priority requests to these network entities; and
the additional selection process allows the computing entity to dispatch requests, during the predetermined time interval, to any network entity in the second record where the request matches the priority request characteristics in the second record.

23. A computing entity according to claim 15, wherein the additional selection process operates to
calculate how many requests to dispatch a communication share a particular characteristic, and
block dispatch of requests sharing said particular characteristic where the number of such requests is determined to be above a predetermined threshold.

24. A computing entity in a network comprising a processor, the computing entity being programmed
to establish a set of records comprising at least a first record indicating identities of other entities in the network to whom a communication has been sent,
for the duration of a predetermined interval of time, to allow dispatch of communications to any network entity in the first record while restricting dispatch of communications to other network entities whose identity is not in the set of records, and
to perform an additional selection process to determine to which network entities whose identity is not in the first record said computing entity is allowed to dispatch a communication;
wherein
the additional selection process selects a predetermined number of requests to dispatch a communication to an entity not identified in the set of records; and
the additional selection process operates to:
calculate how many requests to dispatch a communication share a particular characteristic;
determine the request characteristic shared by the lowest number of requests as the least common request characteristic; and
select for transmission those requests which have in common the least common request characteristic.

* * * * *